US011242741B2

(12) United States Patent
Chen et al.

(10) Patent No.: US 11,242,741 B2
(45) Date of Patent: Feb. 8, 2022

(54) FATIGUE ANALYSIS PROCEDURE FOR DRILL STRING

(71) Applicant: Schlumberger Technology Corporation, Sugar Land, TX (US)

(72) Inventors: Wei Chen, Spring, TX (US); Yani Dong, Beijing (CN); Geng Yun, Spring, TX (US); Yuelin Shen, Spring, TX (US); Sujian Huang, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 480 days.

(21) Appl. No.: 15/572,218

(22) PCT Filed: May 4, 2016

(86) PCT No.: PCT/US2016/030621
§ 371 (c)(1),
(2) Date: Nov. 7, 2017

(87) PCT Pub. No.: WO2016/182798
PCT Pub. Date: Nov. 17, 2016

(65) Prior Publication Data
US 2018/0112512 A1     Apr. 26, 2018

Related U.S. Application Data

(60) Provisional application No. 62/159,592, filed on May 11, 2015.

(30) Foreign Application Priority Data

May 8, 2015   (WO) ................ PCT/CN2015/078623

(51) Int. Cl.
*E21B 47/007* (2012.01)
*G06F 30/20* (2020.01)
(Continued)

(52) U.S. Cl.
CPC ............ *E21B 47/007* (2020.05); *E21B 44/00* (2013.01); *G06F 17/11* (2013.01); *G06F 30/20* (2020.01); *G06F 2111/10* (2020.01)

(58) Field of Classification Search
CPC .... E21B 44/00; E21B 47/0006; E21B 47/007; G06F 17/11; G06F 17/5009;
(Continued)

(56) References Cited

U.S. PATENT DOCUMENTS 9,637,981 B2 *  5/2017  Kirkhope ............... G01N 3/56
9,945,223 B2 *  4/2018  Li ....................... E21B 47/0006
(Continued)

FOREIGN PATENT DOCUMENTS

CN     103455671      12/2013
CN     103967428       8/2014
(Continued)

OTHER PUBLICATIONS

Chen, Wen-Ching. "Drillstring fatigue performance." SPE drilling engineering 5.02 (1990): 129-134.*
(Continued)

*Primary Examiner* — Cedric Johnson
(74) *Attorney, Agent, or Firm* — Alec J. McGinn

(57) ABSTRACT

Management of fatigue life includes partitioning a drilling interval into sections, and calculating a stress value for each section. From the stress value, an equivalent alternative stress amplitude is calculated for each location, and a fatigue life consumption value in each section is computed. The fatigue life consumption value across the sections is aggregated to obtain an aggregated fatigue life consumption value, which is presented.

22 Claims, 32 Drawing Sheets

(51) Int. Cl.
*E21B 44/00* (2006.01)
*G06F 17/11* (2006.01)
*G06F 111/10* (2020.01)

(58) Field of Classification Search
CPC .. G06F 2111/10; G06F 2217/16; G06F 30/20; G06F 30/00
USPC .................................................. 703/10, 2, 6
See application file for complete search history.

(56) References Cited

U.S. PATENT DOCUMENTS

| | | | |
|---|---|---|---|
| 2004/0035216 A1* | 2/2004 | Morrison | E21B 17/015 73/800 |
| 2004/0221985 A1* | 11/2004 | Hill | E21B 44/00 166/250.01 |
| 2006/0230839 A1* | 10/2006 | Morrison | E21B 17/015 73/800 |
| 2008/0128138 A1* | 6/2008 | Radi | E21B 19/004 166/350 |
| 2012/0016589 A1 | 1/2012 | Li et al. | |
| 2012/0303293 A1 | 11/2012 | McNeill et al. | |
| 2013/0098683 A1 | 4/2013 | Turner et al. | |
| 2015/0075274 A1 | 3/2015 | Kpetehoto et al. | |

FOREIGN PATENT DOCUMENTS

| | | | |
|---|---|---|---|
| JP | H0666409 | 1/1989 | |
| JP | H062835 | 1/1994 | |
| JP | 5050873 B2 | 8/2009 | |
| WO | WO2004094768 A2 | 11/2004 | |
| WO | WO-2016179767 A1 * | 11/2016 | ............. F17D 1/005 |

OTHER PUBLICATIONS

International Search Report and Written Opinion issued in International Patent application PCT/US2016/030621, dated Aug. 30, 2016. 11 pages.

International Search Report and Written Opinion issued in International Patent application PCT/CN2015/078623, dated Feb. 17, 2016. 11 pages.

Downing et al., Simple rainflow counting algorithms. International Journal of Fatigue, vol. 4, Issue 1, Jan. 1982, pp. 31-40.

* cited by examiner

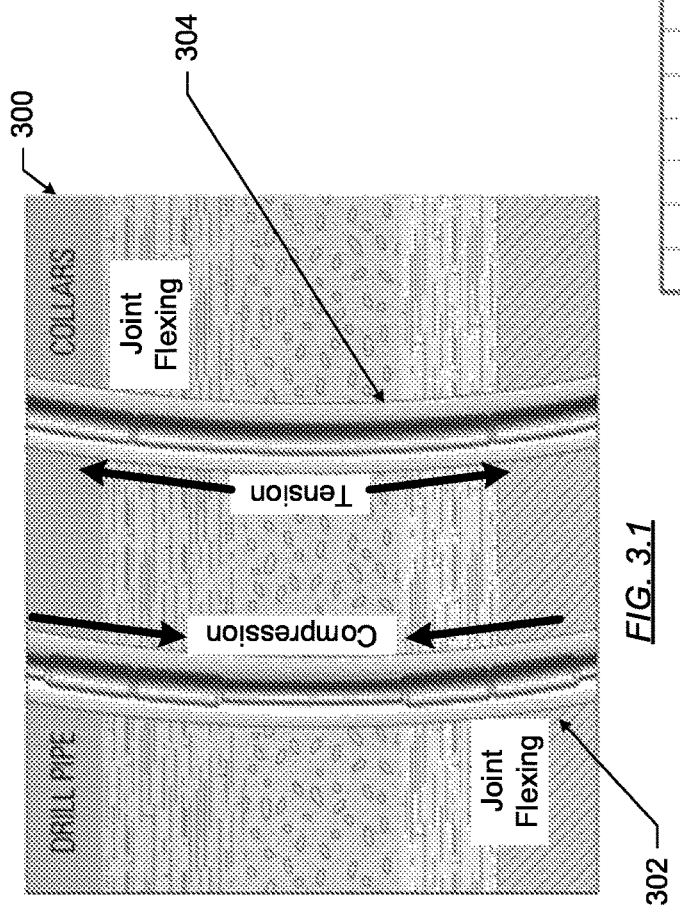
FIG. 3.1
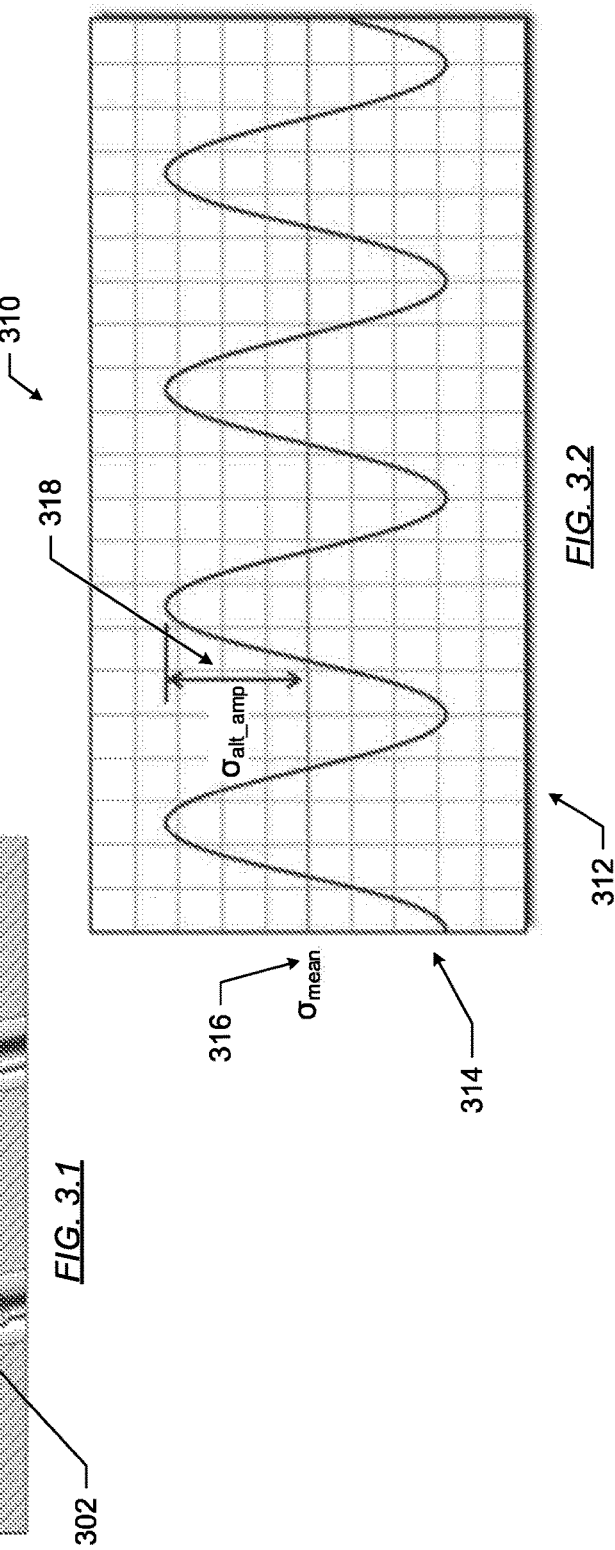
FIG. 3.2

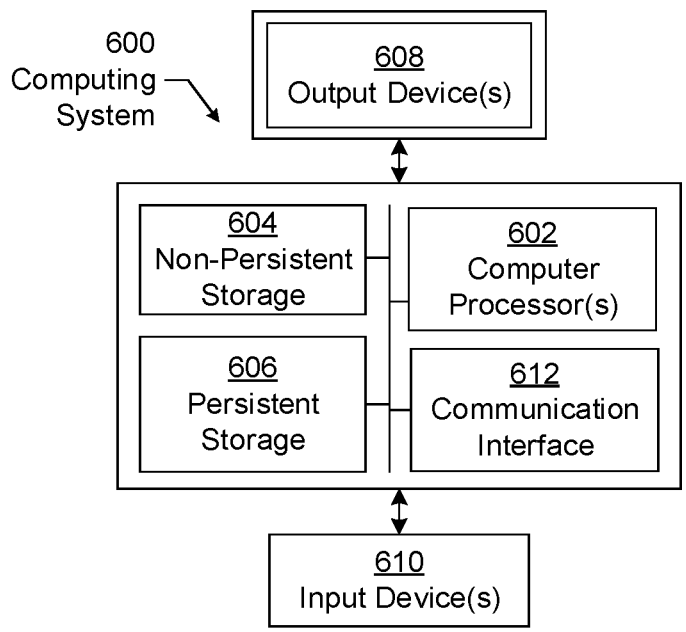
FIG. 6.1
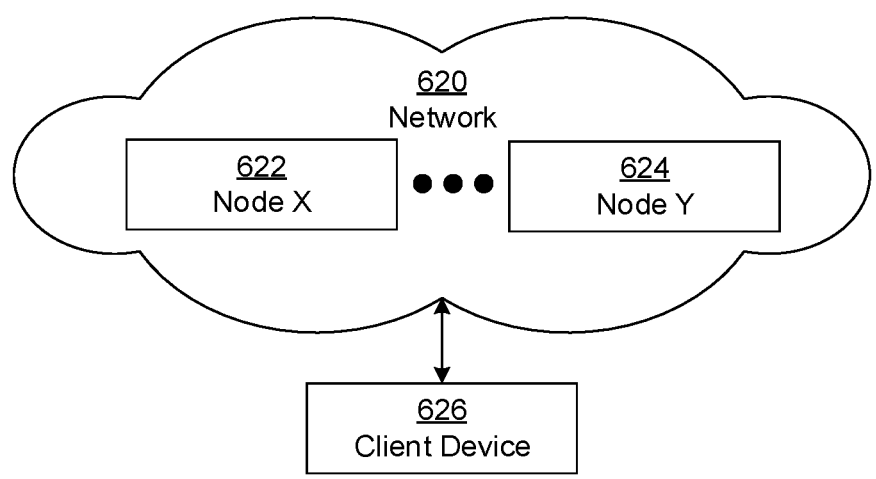
FIG. 6.2

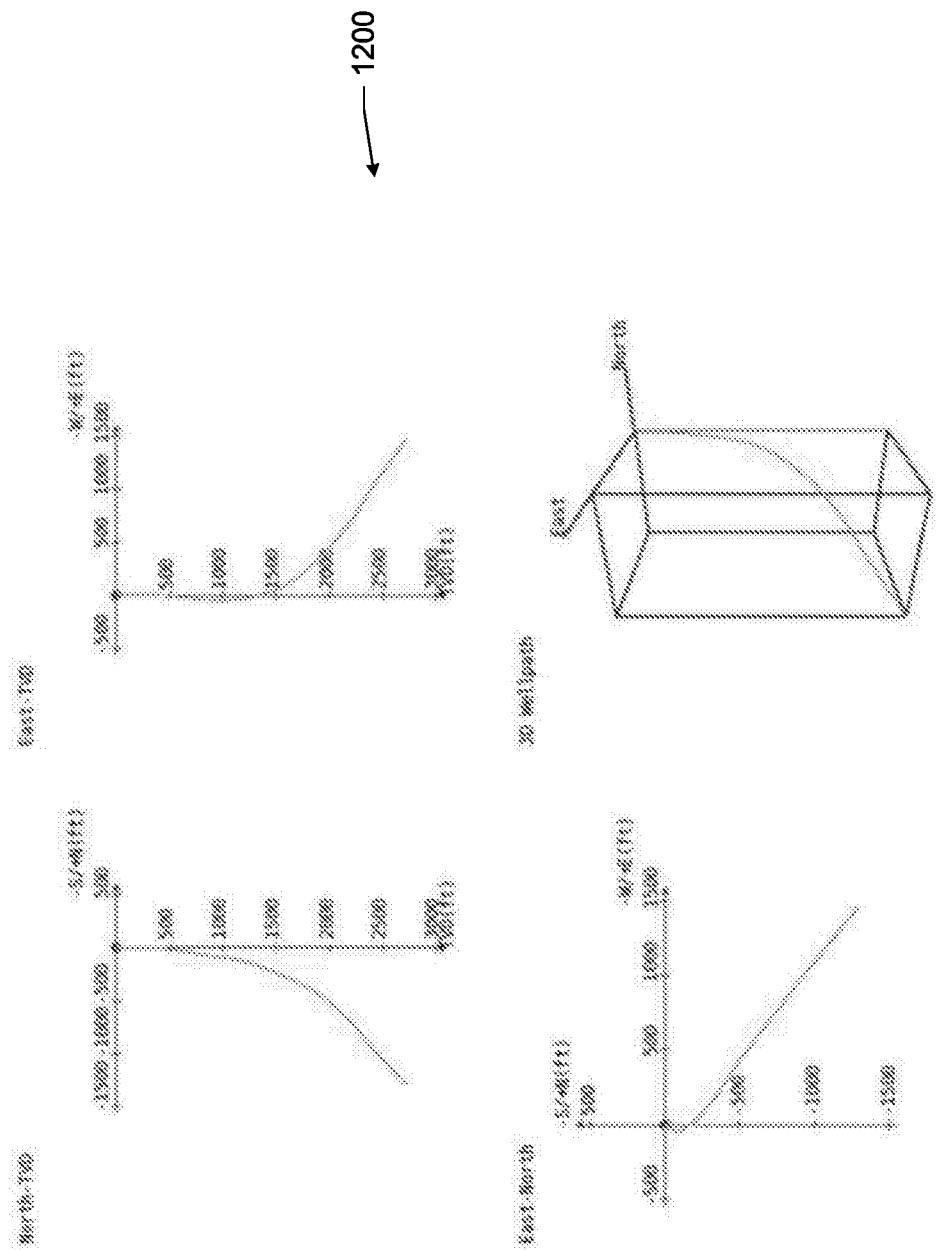
FIG. 12.1

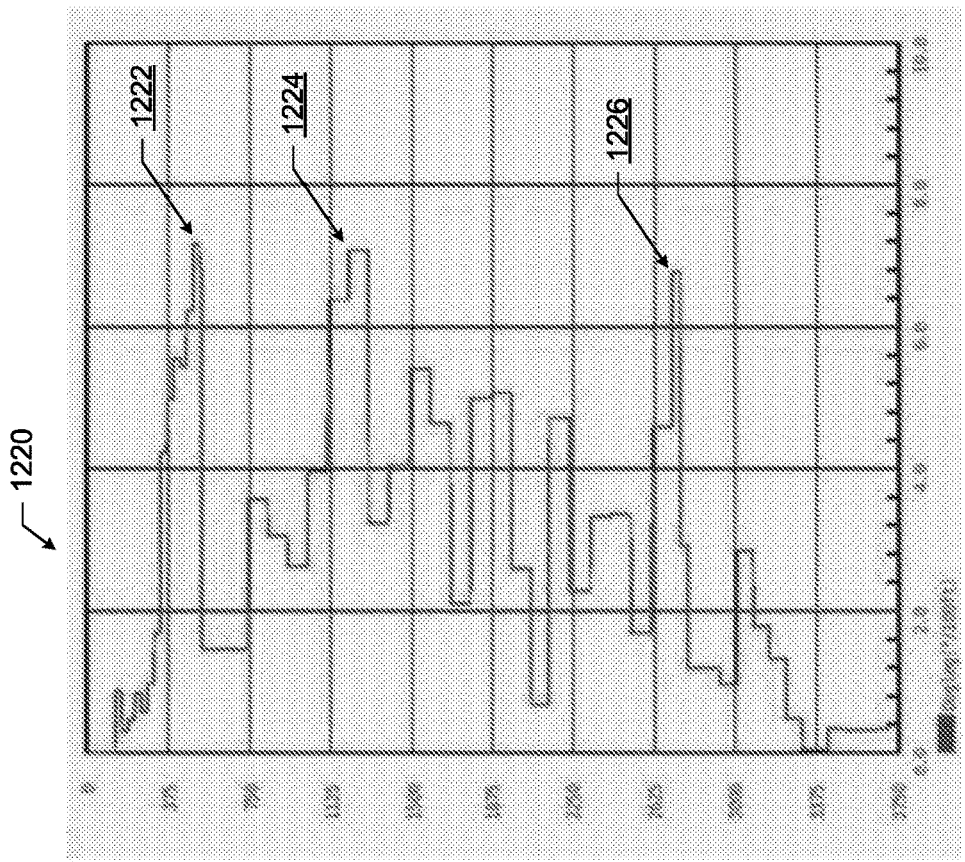
*FIG. 12.3*
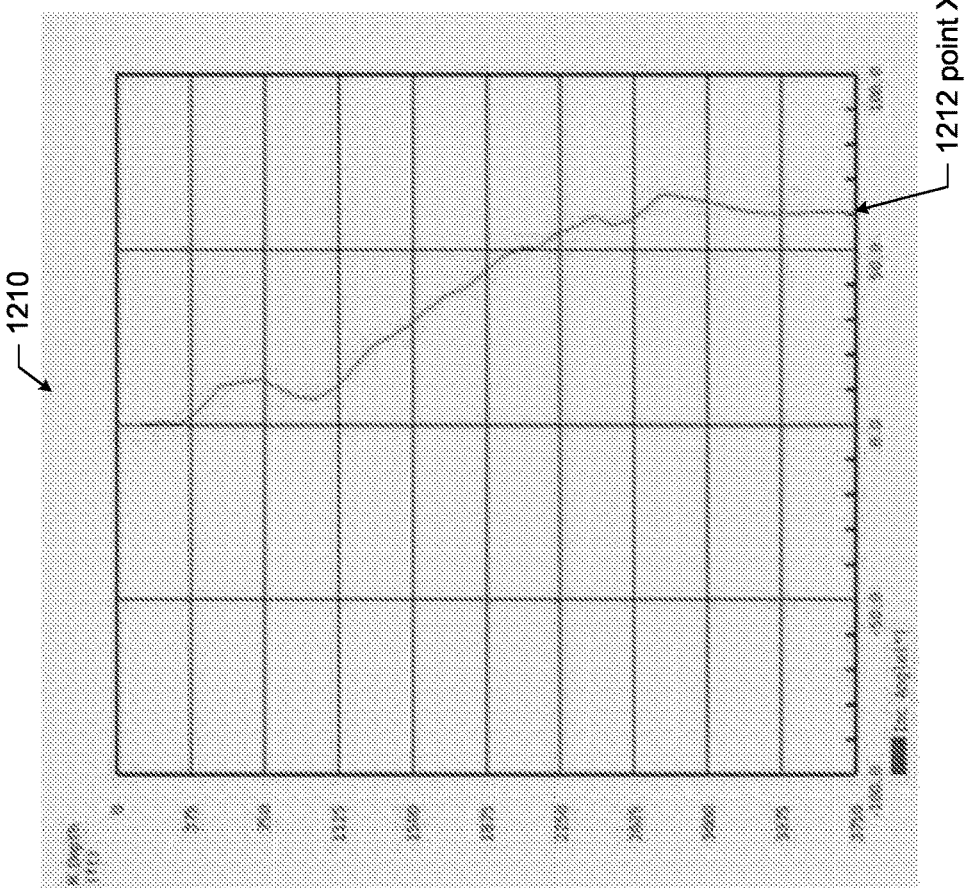
*FIG. 12.2*

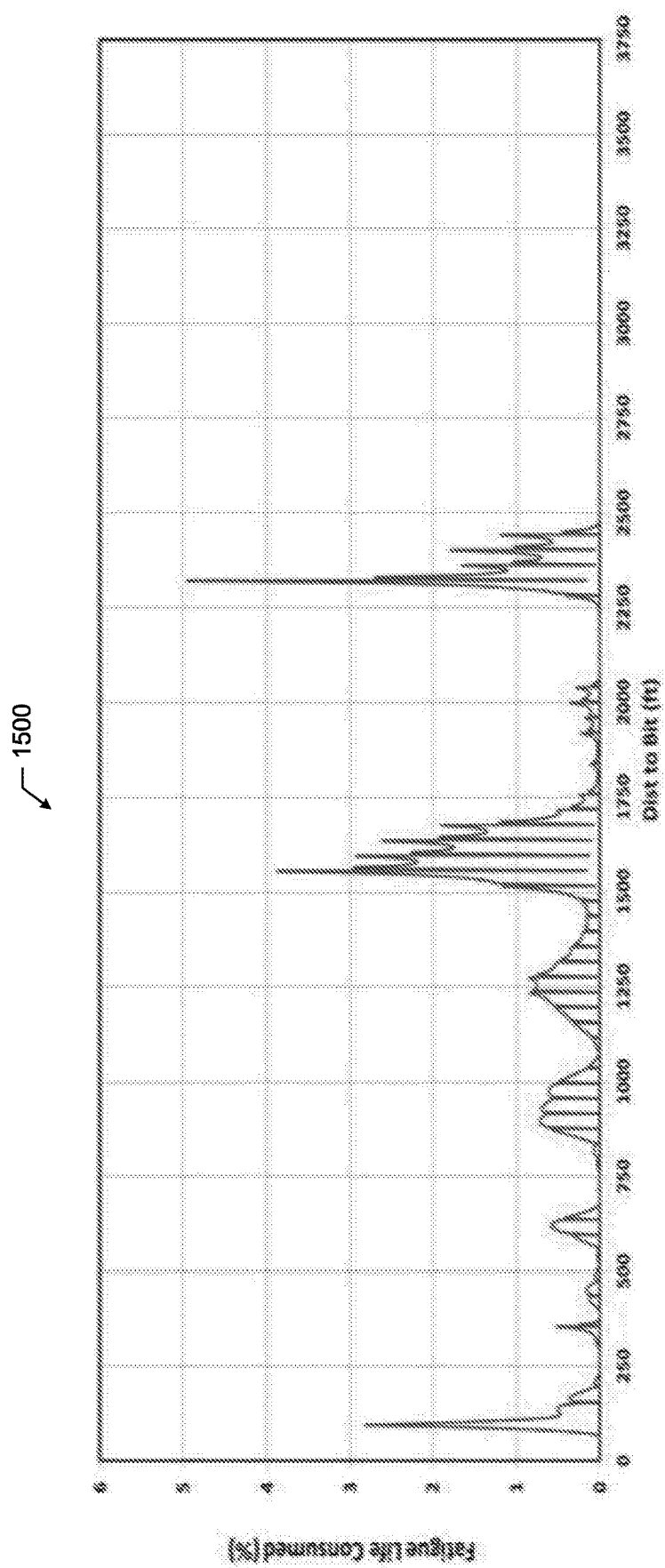
FIG. 15.1

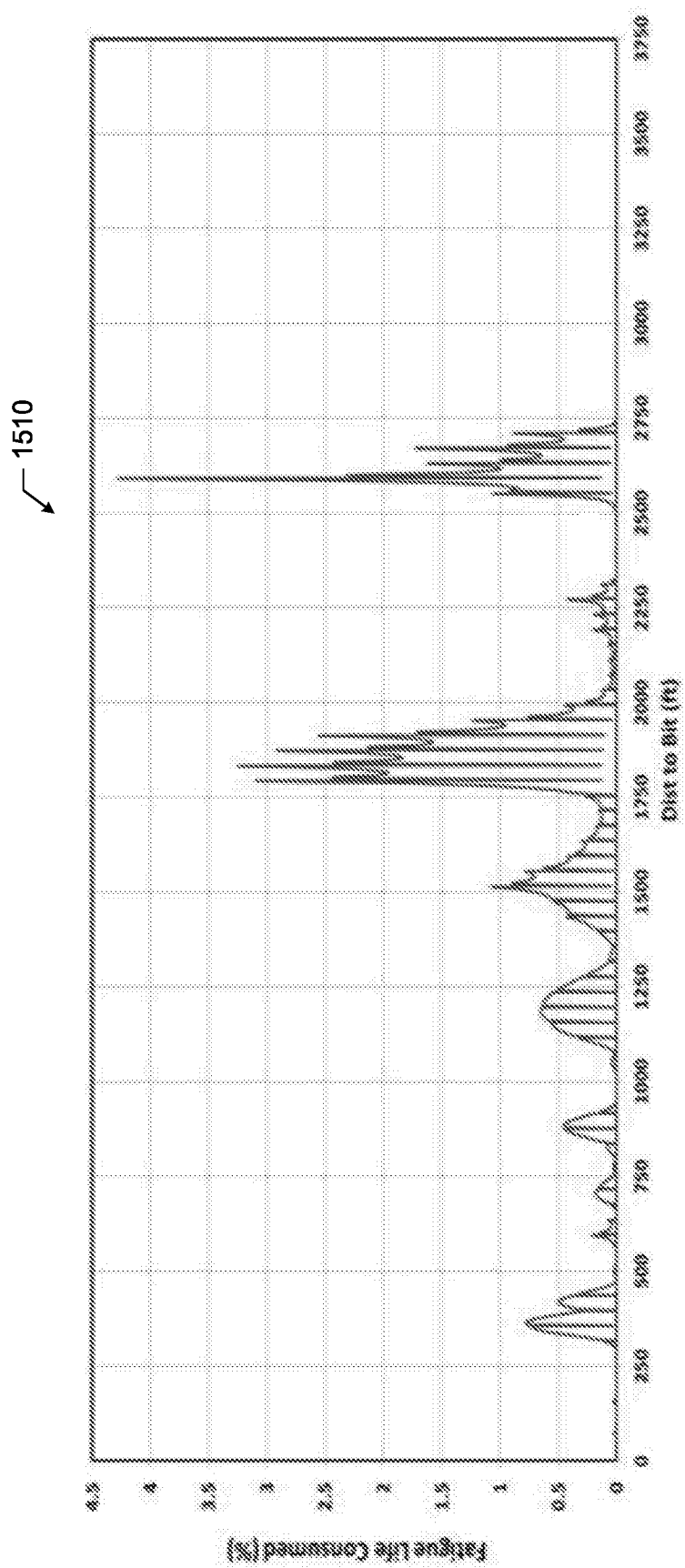
FIG. 15.2

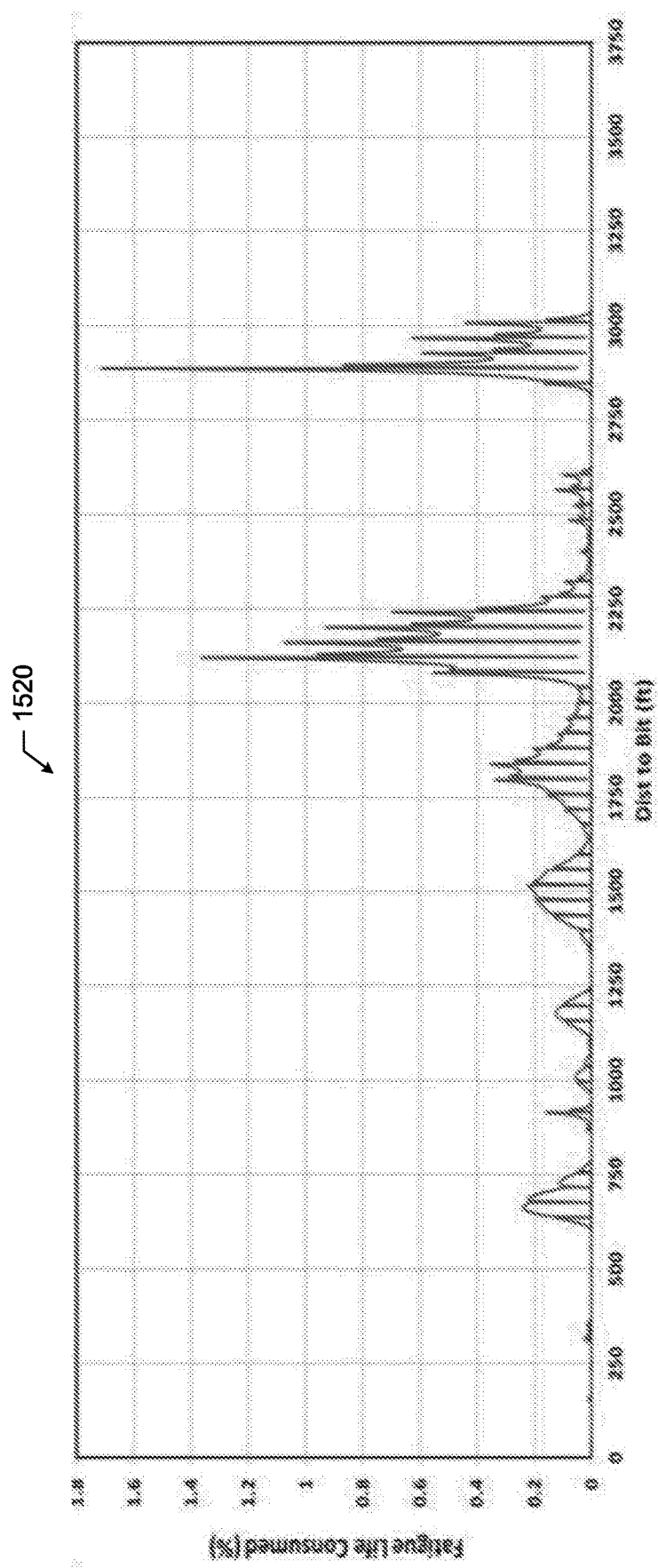
FIG. 15.3

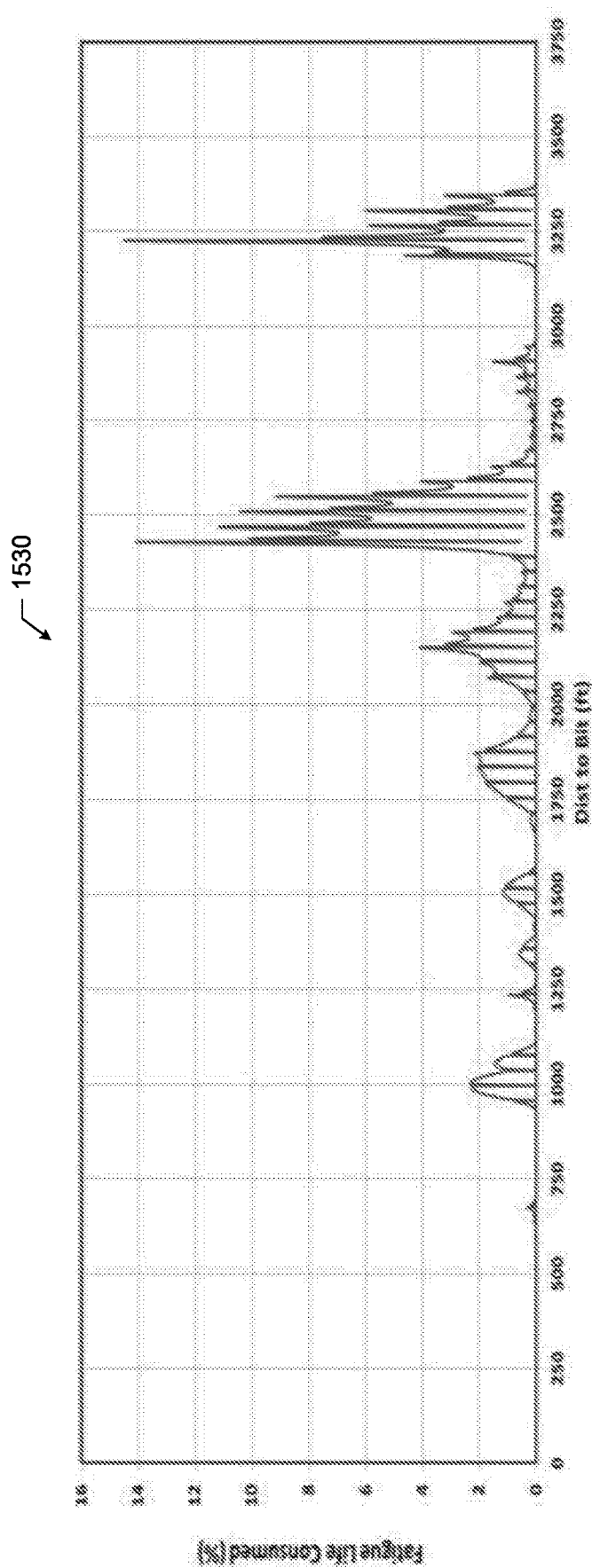
FIG. 15.4

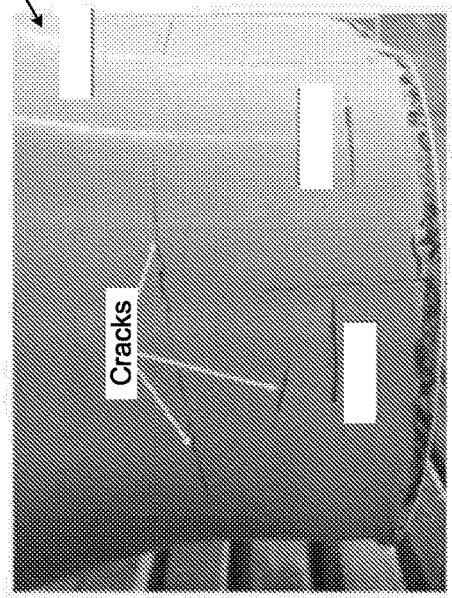
FIG. 17.2
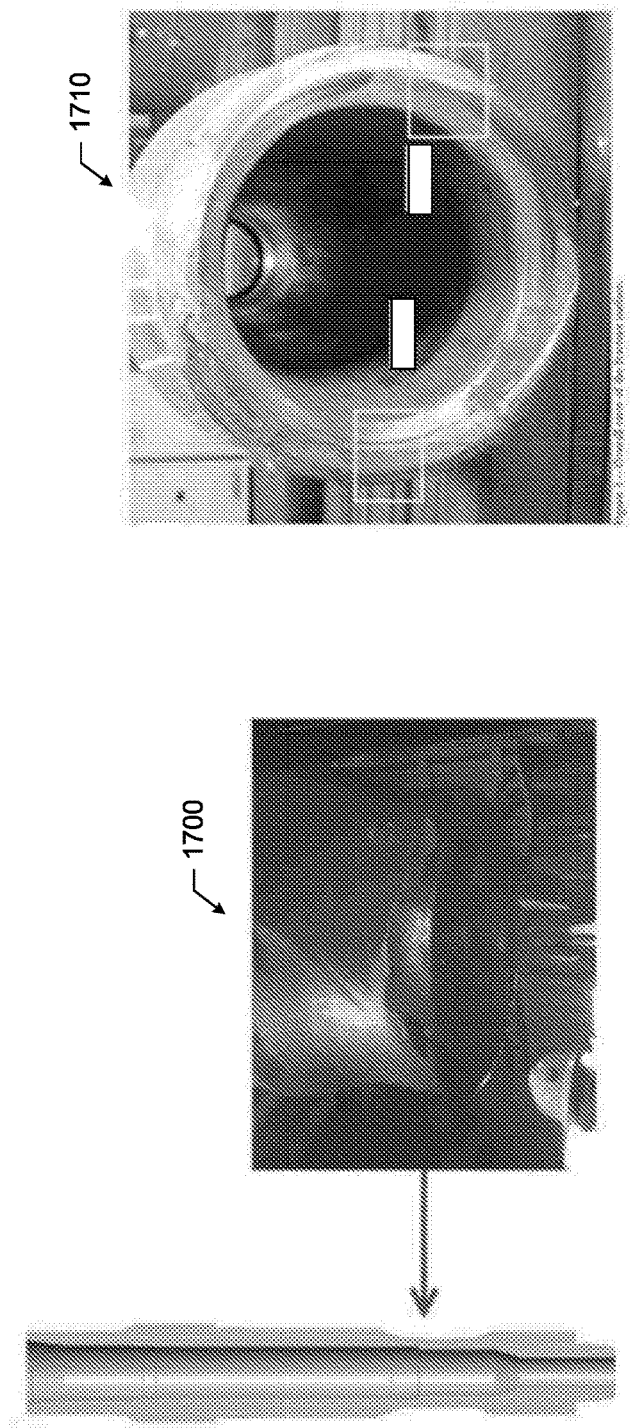
FIG. 17.3
FIG. 17.1

| | |
|---|---|
| Depth MD (ft) | 21,581 |
| WOB (klbs) | 25 |
| Surface RPM | 90 (1.5Hz) |
| Mud Wt. (ppg) | 13.4 |
| Well friction (CH/OH) | 0.2/0.25 |
| PD Steering ratio | 0% |
| Formation at bit | CM_9000 |
| Formation at reamer | WE_9000 |
| Simulation length | 400revs |

*FIG. 19*

| Temp. interval Cycles in 3Hour | Cycles in Stratified | Cycles in 3Hour | Avg. Amp | Avg. Mean | Avg. alternative endurance_cycle | Life consumed |
|---|---|---|---|---|---|---|
| 0.0~1.1 | 70 | 7561 | 0.23 | 0.24 | 8.60E+12 | 0.00% |
| 1.2~2.4 | 0 | 0 | 0.00 | 0.00 | NA | 0.00% |
| 2.4~3.6 | 0.5 | 54 | 3.30 | 3.79 | 1.35E+08 | 0.00% |
| 3.6~4.8 | 0.5 | 54 | 3.86 | -13.48 | 6.27E+07 | 0.00% |
| 4.9~6.1 | 0 | 0 | 0.00 | 0.00 | NA | 0.00% |
| 6.1~7.3 | 0 | 0 | 0.00 | 0.00 | NA | 0.00% |
| 7.3~8.5 | 0 | 0 | 0.00 | 0.00 | NA | 0.00% |
| 8.5~9.7 | 0 | 0 | 0.00 | 0.00 | NA | 0.00% |
| 9.7~10.9 | 2 | 216 | 11.56 | -1.30 | 1.48E+06 | 0.01% |
| 10.9~12.2 | 5 | 540 | 13.11 | -1.66 | 8.85E+05 | 0.06% |
| 12.2~13.4 | 28 | 3024 | 14.17 | -1.39 | 6.54E+05 | 0.46% |
| 13.4~14.6 | 73 | 7885 | 15.28 | -1.48 | 4.83E+05 | 1.63% |
| 14.6~15.8 | 127 | 13717 | 16.41 | -1.34 | 3.65E+05 | 3.75% |
| 15.8~17.0 | 164.5 | 17768 | 17.67 | -1.18 | 2.73E+05 | 6.50% |
| 17.0~18.2 | 156 | 16850 | 18.83 | -1.00 | 2.13E+05 | 7.89% |
| 18.2~19.4 | 99.5 | 10747 | 20.00 | -0.92 | 1.68E+05 | 6.39% |
| 19.4~20.7 | 59 | 6373 | 21.19 | -0.74 | 1.35E+05 | 4.74% |
| 20.7~21.9 | 25.5 | 2754 | 22.37 | -0.72 | 1.08E+05 | 2.54% |
| 21.9~23.1 | 4.5 | 486 | 23.64 | -0.73 | 8.69E+04 | 0.56% |
| 23.1~24.3 | | | | | | |
| | | | | | Cumulative fatigue | 34.54% |

FIG. 28

FATIGUE ANALYSIS PROCEDURE FOR DRILL STRING

CROSS-REFERENCE TO RELATED APPLICATIONS

This application claims priority under 35 U.S.C. § 119(e) to U.S. Provisional Patent Application Ser. No. 62/159,592, filed on May 11, 2015 and entitled, "FATIGUE ANALYSIS PROCEDURE FOR DRILL STRING", which is incorporated herein by reference in its entirety. This application further claims priority under 35 U.S.C. § 120 to PCT Patent Application Serial Number PCT/CN2015/078623, filed on May 8, 2015 and entitled, "FATIGUE ANALYSIS PROCEDURE FOR DRILL STRING", which is incorporated herein by reference in its entirety.

BACKGROUND

Computer simulation estimates the operations of a real-world system. Generally, computer simulation allows a user to test various control parameters to select an optimal control parameter. For example, in field management, computer simulation may be used to plan the drilling and production of valuable downhole assets. In particular, drilling simulation is used extensively to design drilling tools and plan for drilling operations.

SUMMARY

In general, in one aspect, embodiments relate to a method, system, and computer readable medium for management of fatigue life. Management of fatigue life includes partitioning a drilling interval into sections, and calculating a stress value for each section. From the stress value, an equivalent alternative stress amplitude is calculated for each location, and a fatigue life consumption value in each section is computed. The fatigue life consumption value across the sections is aggregated to obtain an aggregated fatigue life consumption value, which is presented.

Other aspects of the technology will be apparent from the following description and the appended claims.

BRIEF DESCRIPTION OF DRAWINGS

FIGS. 3.1, 3.2, and 4 show examples in accordance with one or more embodiments of the technology.

FIGS. 5, 6.1, and 6.2 show schematic diagrams in accordance with one or more embodiments of the technology.

FIGS. 11, 12.1, 12.2, 12.3, 13, 14, 15.1, 15.2, 15.3, 15.4, 16, 17.1, 17.2, 17.3, 18, 19, 20, 21, 22, 23, 24, 25, 26, 27, and 28 show examples in accordance with one or more embodiments of the technology.

DETAILED DESCRIPTION

Figure 1:
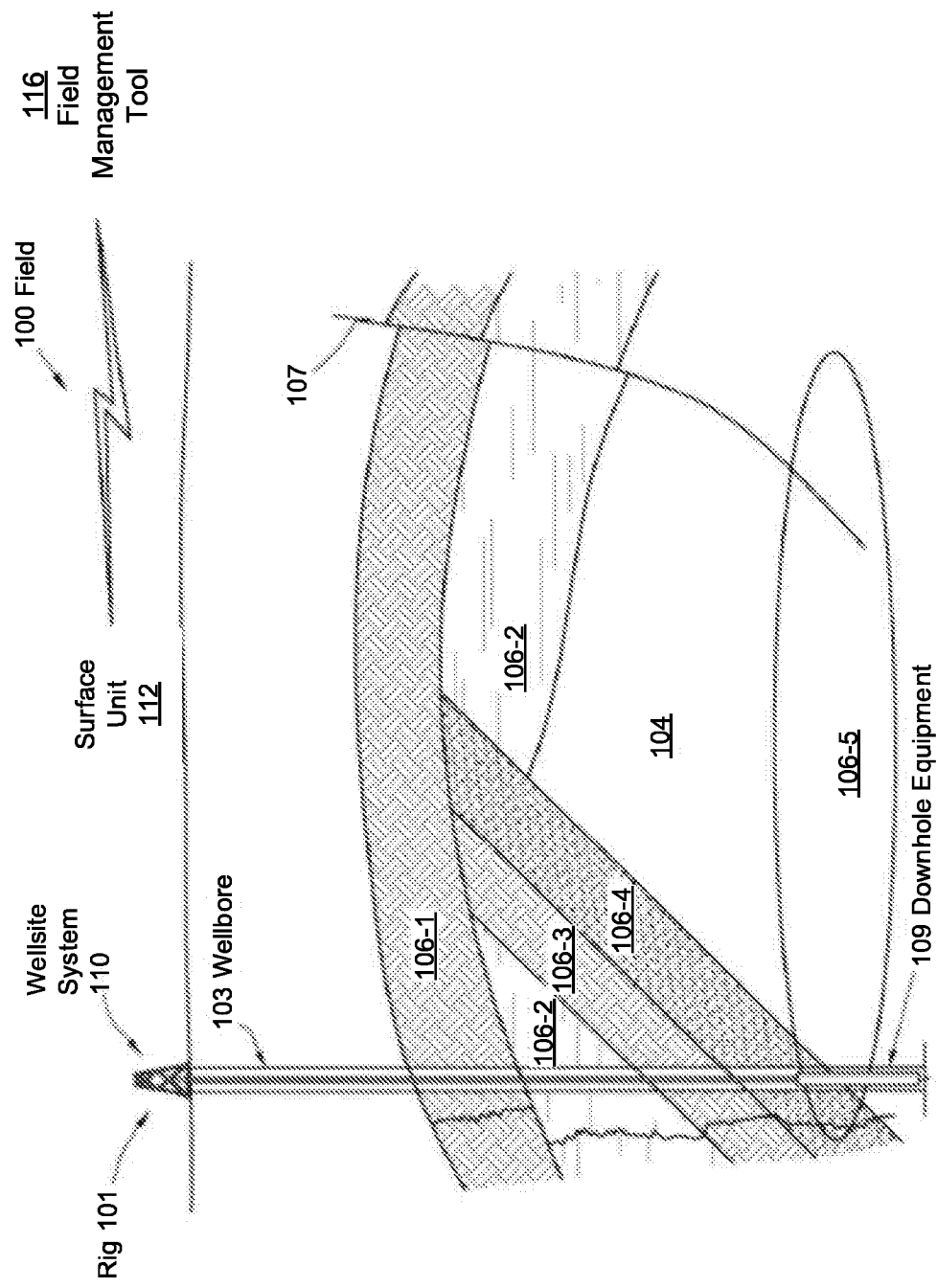
FIGS. 1 and 2 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to real-time management of drilling operations. One or more embodiments may be used to plan drilling operations, in real-time during drilling operations to predict a failure, and/or as post drilling analysis (e.g., analyze a failure that occurred during the drilling) In particular, one or more embodiments manage the fatigue life of a drilling interval. Fatigue life managing is managing stress on equipment, such as when rotating while drilling the hole. One or more embodiments may detect and manage the remaining amount of life of each part of equipment.

FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

A subterranean formation (104) is in an underground geological region. An underground geological region is a geographic area that exists below land or ocean. In one or more embodiments, the underground geological region includes the subsurface formation in which a borehole is or may be drilled and any subsurface region that may affect the drilling of the borehole, such as because of stresses and strains existing in the subsurface region. In other words, the underground geological region may not just include the area immediately surrounding a borehole or where a borehole may be drilled, but also any area that affects or may affect the borehole or where the borehole may be drilled.

As shown in FIG. 1, the subterranean formation (104) may include several geological structures (106-1 through 106-4) of which FIG. 1 provides an example. As shown, the formation may include a sandstone layer (106-1), a limestone layer (106-2), a shale layer (106-3), and a sand layer (106-4). A fault line (107) may extend through the formation. In one or more embodiments, various survey tools and/or data acquisition tools are adapted to measure the formation and detect the characteristics of the geological structures of the formation. Further, as shown in FIG. 1, the wellsite system (110) is associated with a rig (101), a wellbore (103), and other field equipment and is configured to perform wellbore operations, such as logging, drilling, fracturing, production, or other applicable operations. The wellbore (103) may also be referred to as a borehole.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the wellsite system (110), or other part of the field (100). The surface unit (112) may also be provided with or functionally for actuating mechanisms at the field (100). The surface unit (112) may then send command signals to the field (100) in response to data received, for example, to control and/or optimize various field operations described above.

During the various oilfield operations at the field, data is collected for analysis and/or monitoring of the oilfield operations. Such data may include, for example, subterranean formation, equipment, historical and/or other data. Static data relates to, for example, formation structure and geological stratigraphy that define the geological structures of the subterranean formation. Static data may also include data about the wellbore, such as inside diameters, outside diameters, and depths. Dynamic data relates to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected from the wellbore and the oilfield may be used to create and update a three dimensional model of the subsurface formations. Additionally, static and dynamic data from other wellbores or oilfields may be used to create and update the three dimensional model. Hardware sensors, core sampling, and well logging techniques may be used to collect the data. Other static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once the well is formed and completed, fluid flows to the surface using production tubing and other completion equipment. As fluid passes to the surface, various dynamic measurements, such as fluid flow rates, pressure, and composition may be monitored. These parameters may be used to determine various characteristics of the subterranean formation.

In one or more embodiments, the data is received by the surface unit (112), which is communicatively coupled to the field management tool (116). Generally, the field management tool (116) is configured to analyze, model, control, optimize, or perform other management tasks of the aforementioned field operations based on the data provided from the surface unit (112). Although the surface unit (112) is shown as separate from the field management tool (116) in FIG. 1, in other examples, the surface unit (112) and the field management tool (116) may also be combined.

During a drilling operation, drilling tools are deployed from the oil and gas rigs. The drilling tools advanced into the earth along a path to locate reservoirs containing the valuable downhole assets. In one or more embodiments, the optimal path for the drilling is identified in a well plan that uses three-dimensional modeling.

Fluid, such as drilling mud or other drilling fluids, is pumped down the wellbore (or borehole) through the drilling tool and out the drilling bit. The drilling fluid flows through the annulus between the drilling tool and the wellbore and out the surface, carrying away earth loosened during drilling. The drilling fluids return the earth to the surface, and seal the wall of the wellbore to prevent fluid in the surrounding earth from entering the wellbore and causing a 'blow out'.

During the drilling operation, the drilling tool may perform downhole measurements to investigate downhole conditions. The drilling tool may be used to take core samples of subsurface formations. In some cases, the drilling tool is removed and a wireline tool is deployed into the wellbore to perform additional downhole testing, such as logging or sampling. Steel casing may be run into the well to a desired depth and cemented into place along the wellbore wall. Drilling may be continued until the desired total depth is reached.

After the drilling operation is complete, the well may then be prepared for production. Wellbore completions equipment is deployed into the wellbore to complete the well in preparation for the production of fluid through the wellbore. Fluid is then allowed to flow from downhole reservoirs, into the wellbore and to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters, to manipulate the oilfield operations and/or to separate and direct fluids from the wells. Surface equipment and completion equipment may also be used to inject fluids into reservoir either for storage or at strategic points to enhance production of the reservoir.

Sensors (S) are located about the wellsite to collect data, may be in real time, concerning the operation of the wellsite, as well as conditions at the wellsite. The sensors may also have features or capabilities, of monitors, such as cameras (not shown), to provide pictures of the operation. Surface sensors or gauges S may be deployed about the surface systems to provide information about the surface unit, such as standpipe pressure, hook load, depth, surface torque, rotary rpm, among others. Downhole sensors or gauges (S) are disposed about the drilling tool and/or wellbore to provide information about downhole conditions, such as wellbore pressure, weight on bit, torque on bit, direction, inclination, collar rpm, tool temperature, annular temperature, and tool face, among others. For example, the sensors may include one or more of a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors. Example down hole drill string sensors include functionality to obtain drilling dynamics measurements, such as tri-axis accelerations, collar rotations per minute (RPM) and stick-slip, bending moment, down hole torque, and axial weight. Sensors that perform measurement while drilling and logging while drilling may include functionality to perform caliper logging, acquire annulus pressure and equivalent circulating density (ECD) measurements, perform a well survey, acquire shock and vibration measurements, and obtain formation information at the drilling depths and ahead of bit. The information collected by the sensors and cameras is conveyed to the various parts of the drilling system and/or the surface control unit.

At the rig floor or the surface, the sensors may include functionality to obtain input drilling parameters (e.g., Source RPM (SRPM) (actual table revolution), rotating/sliding, rotary steerable system (RSS) steering ratio and through flow line (TF), weight on bit (WOB) and hook load, and flow rate and MW), surface drilling measurements (e.g., surface torque, stand pipe pressure, top drive block location/feeding speed (ROP)), and mud logging (e.g., cuttings, and formation type and unconfined compression strength (UCS)).

Figure 2:
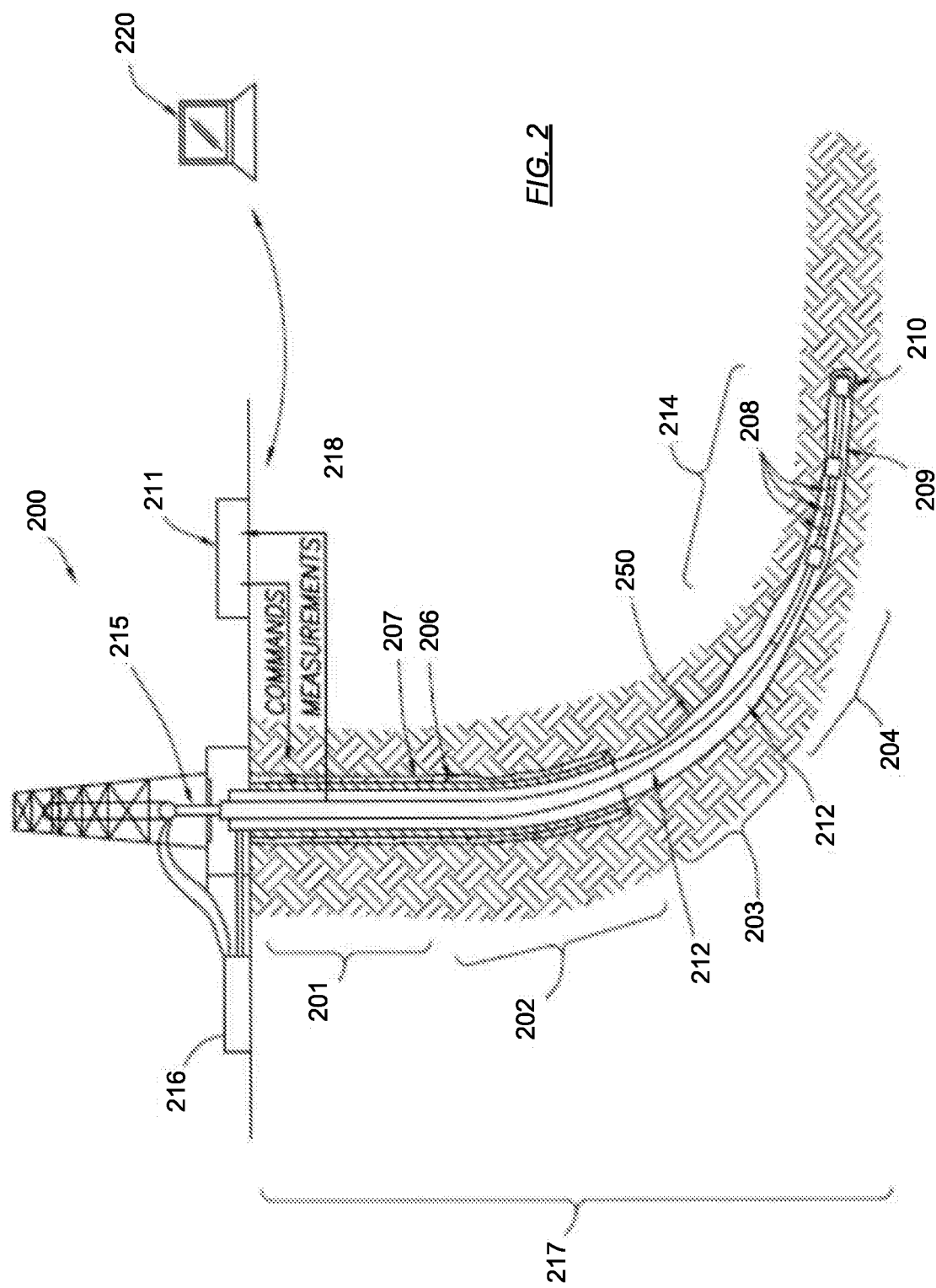

FIG. 2 shows a schematic diagram depicting drilling operation of a directional well in multiple sections. The drilling operation depicted in FIG. 2 includes a wellsite drilling system (200) and a field management tool (220) for accessing fluid in the target reservoir through a bore hole (250) of a directional well (217). The wellsite drilling system (200) includes various components (e.g., drill string (212), annulus (212), Kelly (215), mud pit (216), etc.) as generally described with respect to the wellsite drilling systems (100) (e.g., drill string (115), annulus (126), Kelly (116), mud pit (122), etc.) of FIG. 1 above. As shown in FIG. 2, the target reservoir may be located away from (as opposed to directly under) the surface location of the well (217). Accordingly, special tools or techniques may be used to ensure that the path along the bore hole (250) reaches the particular location of the target reservoir (200).

The drill string (212) may include bottom hole assembly (214) (BHA) in accordance with one or more embodiments of the invention. The drill string and BHA may be the same or similar to the drill string and BHA discussed above with reference to FIG. 1. In one or more embodiments, at least a portion of the drill string may be referred to as a drilling interval. In other words, a drilling interval is at least a part of the drill string. In one or more embodiments, the drilling interval may be at least a portion of the borehole. In such embodiments, rather than defining the drilling interval with respect to the drill string, the drilling interval may be defined with respect to the borehole.

In one or more embodiments, the BHA (214) may include sensors (208), rotary steerable system (209), and the bit (210) to direct the drilling toward the target guided by a pre-determined survey program for measuring location details in the well. Furthermore, the subterranean formation through which the directional well (217) is drilled may include multiple layers (not shown) with varying compositions, geophysical characteristics, and geological conditions. Both the drilling planning during the well design stage and the actual drilling according to the drilling plan in the drilling stage may be performed in multiple sections (e.g, sections (201), (202), (202), (204)) corresponding to the multiple layers in the subterranean formation. For example, certain sections (e.g., sections (201) and (202)) may use cement (207) reinforced casing (206) due to the particular formation compositions, geophysical characteristics, and geological conditions.

Further as shown in FIG. 2, surface unit (211) (as generally described with respect to the surface unit (124) of FIG. 1) may be operatively linked to the wellsite drilling system (200) and the field management tool (220) via communication links (218). The surface unit (211) may be configured with functionalities to control and monitor the drilling activities by sections in real-time via the communication links (218). The field management tool (220) may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link (218) according to a drilling operation workflow. The communication link (218) may comprise the communication subassembly (252) as described with respect to FIG. 1 above.

To facilitate the processing and analysis of data, simulators may be used to process the data. Specific simulators are often used in connection with specific oilfield operations, such as reservoir or wellbore production. Data fed into the simulator(s) may be historical data, real time data or combinations thereof. Simulation through one or more of the simulators may be repeated or adjusted based on the data received.

The oilfield operation is provided with wellsite and non-wellsite simulators. The wellsite simulators may include a reservoir simulator, a wellbore simulator, and a surface network simulator. The reservoir simulator solves for hydrocarbon flowrate through the reservoir and into the wellbores. The wellbore simulator and surface network simulator solve for hydrocarbon flowrate through the wellbore and the surface gathering network of pipelines. As shown, some of the simulators may be separate or combined, depending on the available systems.

The non-wellsite simulators may include process and economics simulators. The processing unit has a process simulator. The process simulator models the processing plant (e.g., the process facility) where the hydrocarbon is separated into its constituent components (e.g., methane, ethane, propane, etc.) and prepared for sales. The oilfield is provided with an economics simulator. The economics simulator models the costs of part or the entire oilfield. Various combinations of these and other oilfield simulators may be provided.

When gathering the field data, sensors might not be located along the entire length of the drill string, but rather a few positions may have measurement values. In such a scenario, when the field management tool receives the gathered field data, the field management tool may provide an estimation as to the remaining positions. The field management tool may include functionality to generate dynamics simulation model, calibrate and re-calibrate the model using real-time data, execute the calibrated model, monitor variables through simulation, identify and warn of dangerous conditions, and explore parameters to mitigate adverse drilling dynamics. The field management tool may provide simulation results to the surface unit, which displays the simulation results and event warnings.

Variables monitoring and diagnostics may include monitoring drilling efficiency (e.g., cutting structure compatibility (bit reamer balance) and bit wear), drilling stability (e.g., vibration levels along BHA, damaging vibration mode (whirling, stick-slip), neutral point), robustness (e.g., cumulative fatigue of drill string, drill string buckling, and overloading detection (predicted stress versus tool strength data), measurement quality (e.g., survey rectification accounting for BHA sag, collar lateral displacement at MWD sensors), borehole quality (e.g., hole tortuosity/hole microDLS/hole spiraling, and hole size variation), directional tendency (e.g., Steering parameter sensitivity (WOB, SR, Cycle, FLOW, sliding/rotating distance) and other aspects of drilling (e.g., motor TF rectification accounting for drill string twist, stuck point depth estimation, and jarring impact). The system may perform warning and advising to the drilling process including, pulling out of hole (POOH) based on high cumulative fatigue and severe cutting structure wear. The system may recommend to pull off bottom based on damaging whirling motion detected, excessive drill string buckling detected. The system may recommend a drilling parameter change based on high lateral/axial/torsional vibrations detected, poor borehole quality, challenging formation drilling (formation information based on LWD, mud logging, and the look-ahead detection of LWD), poor directional control, poor weight distribution between bit and reamer, an undesired neutral point depth, and mild drill string buckling.

One or more embodiments is directed to managing fatigue life of a drill string. Fatigue is weakening of the physical equipment of the drill string caused by repeated variations of stress. Fatigue is a cause of drill string failures. For example, fatigue may account for more than 70% of the total failures. In many cases, drill string fatigue is progressive. In other words, cumulative damage occurs when the drill string is subjected to cycles of stress that accumulate damage to the drill string over time. The stress level for each cycle of stress may be lower than the tensile strength of material. Thus, fatigue failure may be sudden and unexpected. Fatigue may further have multiple stages including crack initiation, propagation, and fracture. One or more embodiments may develop a practical and effective calculation procedure to evaluate the fatigue life of drill string and BHA. The remaining fatigue life is the amount of life that the drill string or a portion thereof has until the drill string fails. For example, the failure may be a break, a fracture, stoppage, or other failure. The fatigue life may be defined in terms of time, the amount of movement of the drill string (e.g., amount of rotations still available), the amount of stress cycles before failure, or another unit of measurement. A fatigue life consumption value is a value that defines the amount of fatigue life that is consumed. The fatigue life consumption value may be defined in terms of the amount of fatigue life remaining without departing from the scope of one or more embodiments. For example, the fatigue life consumption value may be a percentage of the fatigue life, an aggregated amount, or another value.

The sources of cyclic stress may include a rotating pipe or collar, rotating drill string when a part of the drill string is deformed, or bit/BHA backward whirling. For example, lateral deformation caused by buckling and backward whirling may worsen the condition. More particularly, in an oversized hole, the drill string may tend to deform and bend more. FIG. 3.1 shows an example diagram (300) of the causes of fatigue. For example, compression stress (302) may be the compression of a portion of the drill string and tensile stress (304) may be the pulling on different ends of portion of the drill string. FIG. 3.2 shows an example diagram (310) of the cyclic stress over time. In particular, the x-axis (312) is time and the y-axis (314) is the amount of stress. The amplitude of the stress (318) is the amount that the stress varies from the mean stress line (316). A stress value is a value that defines a measure of stress on the drill string or a component thereof. For example, the stress value may be a stress amplitude, mean stress, a measure of compression stress, a measure of tensile stress, or other value representing stress.

Figure 4:
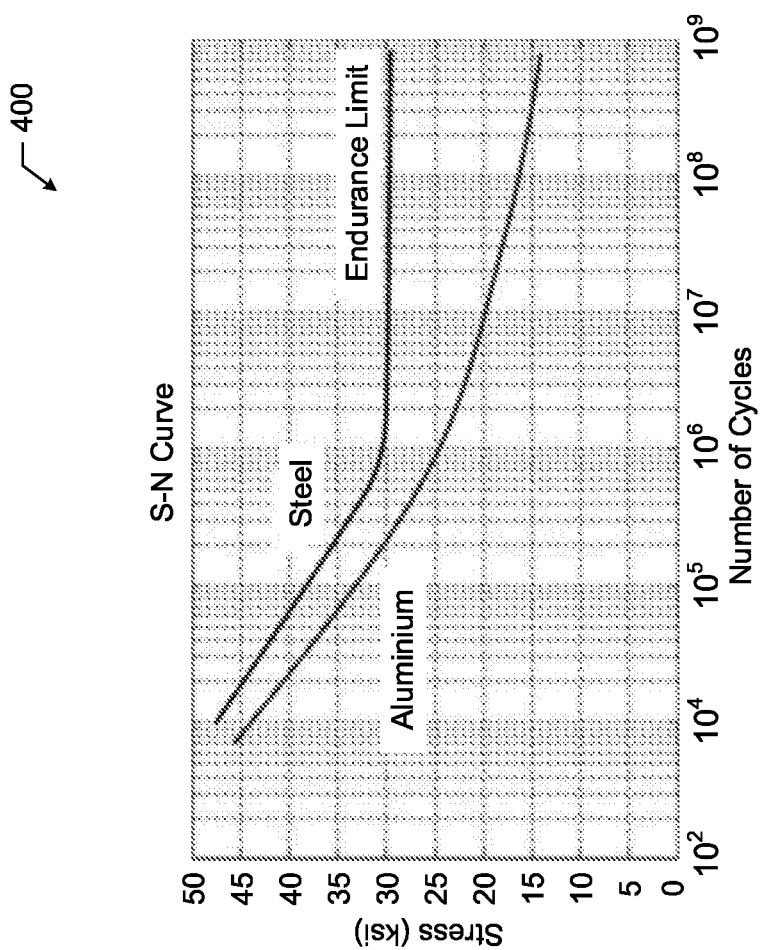

Fatigue limit, endurance limit, and fatigue strength may be used to describe the amplitude of cyclic stress that may be applied to the material without causing fatigue failure. An S-N curve may be generated to show the number of cycles to failure at a given stress amplitude. The S-N curve may be generated by experimental tests to obtain a number of points, and a best fit analysis may be performed on the points in order to determine the curve. FIG. 4 shows an example graph (400) of SN curves for steel and aluminum.

S-N curve may be generated from fatigue test conducted under zero mean stress. In other words, the mean stress is assumed to be zero. To make use of the S-N curve under zero mean stress, equivalent bending stress amplitude may be calculated based on Goodman rule. The Goodman rule may be defined using equation (Eq.1).

$$\frac{\sigma_{alt\_amp}}{\sigma_{equ\_amp}} + \frac{\sigma_{mean}}{\sigma_{ultimate}} = 1 \qquad (Eq. 1)$$

In Eq. 1, $\sigma_{alt\_amp}$ is an actual stress amplitude, $\sigma_{mean}$ is a mean stress, $\sigma_{ultimate}$ is an ultimate tensile strength. $\sigma_{equ\_amp}$ is the bending stress amplitude and may be used to calculate cycle to fatigue in S-N curve. The peak stress value summed with the valley stress value as defined by the stress curve divided by two is the mean stress.

A realistic load history may have varying cyclic stress amplitude, mean stresses, and load frequencies. In other words, the amplitude of the stress may vary over time. Miner's rule may be used to predict the cumulative fatigue damage due to a loading sequence that has different stress amplitudes. Equation (Eq. 2) provides the Miner's rule.

$$D = \sum_i \frac{n_i}{N_i} \qquad (Eq. 2)$$

In Eq. 2, D is cumulative fatigue damage, $n_i$ is a number of cycles at the $i^{th}$ stress amplitude, and $N_i$ is a number of cycles to failure at the $i^{th}$ stress amplitude from S-N curve.

Figure 5:
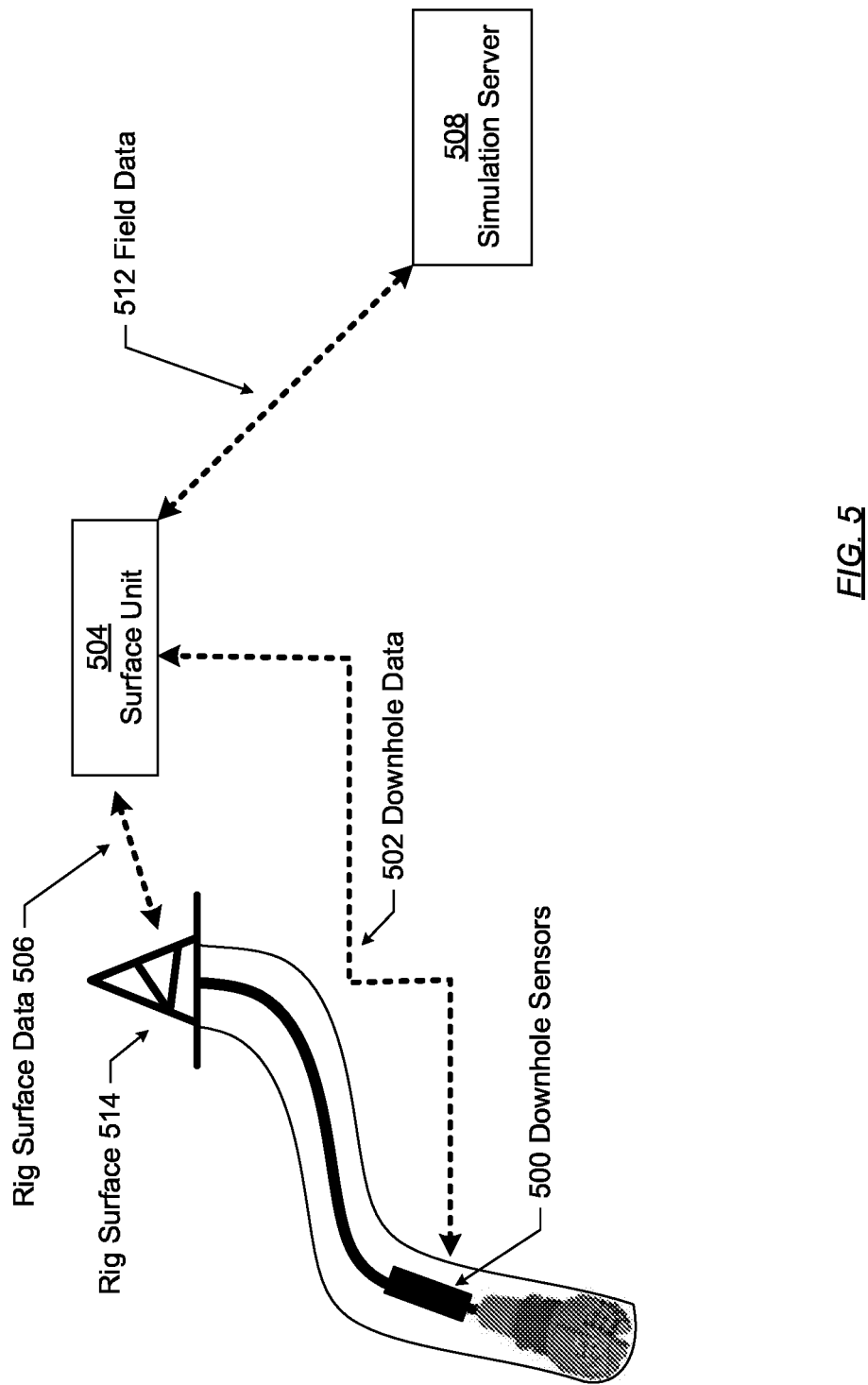

FIG. 5 shows an example of a communication structure in accordance with one or more embodiments of the technology. As shown in FIG. 5, a wellsite drilling system (510) is connected to a surface unit (504) and simulation server (508). The wellsite drilling system (510) and surface unit (504) may be the same or similar to the wellsite drilling system and surface unit discussed above with reference to FIG. 2. As shown in FIG. 5, downhole sensors (500) may transmit downhole data (502) via the communication link to a surface unit (504). Similarly, rig surface data (506) may also be transmitted to surface unit (504). The surface unit (504) may provide the field data (512) to a simulation server (508). The field data (512) includes rig surface data (506) and downhole data (502). The rig surface data (506) is any data that is collected from the rig surface (514). The downhole data (502) is any data collected downhole. Example rig surface data (506) and downhole data (502) may include any of the data described above with reference to FIGS. 1 and 2.

Continuing with FIG. 5, the simulation server (508) may execute the field management tool, discussed above. For example, the simulation server (508) may correspond to a computing system shown in FIGS. 5.1 and 5.2 and described below. As shown in FIG. 5, real time information in the form of the field data (512) is obtained from the wellsite as part of data acquisition and monitoring. Further, wellbore and reservoir information may be gathered. The surface unit may compile the rig surface data (506) and downhole data (502) and send the field data (512) to the simulation server (508). For example, the surface unit (504) may interface with the device controller of each item of equipment to gather and compile the data from the item of the equipment.

In one or more embodiments, the field management tool discussed above may be implemented as or execute on a computing system. The computing system may be combination of mobile, desktop, server, embedded, or other types of hardware. Embodiments of the invention may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform at least a portion of one or more embodiments of the invention.

Figure 7:
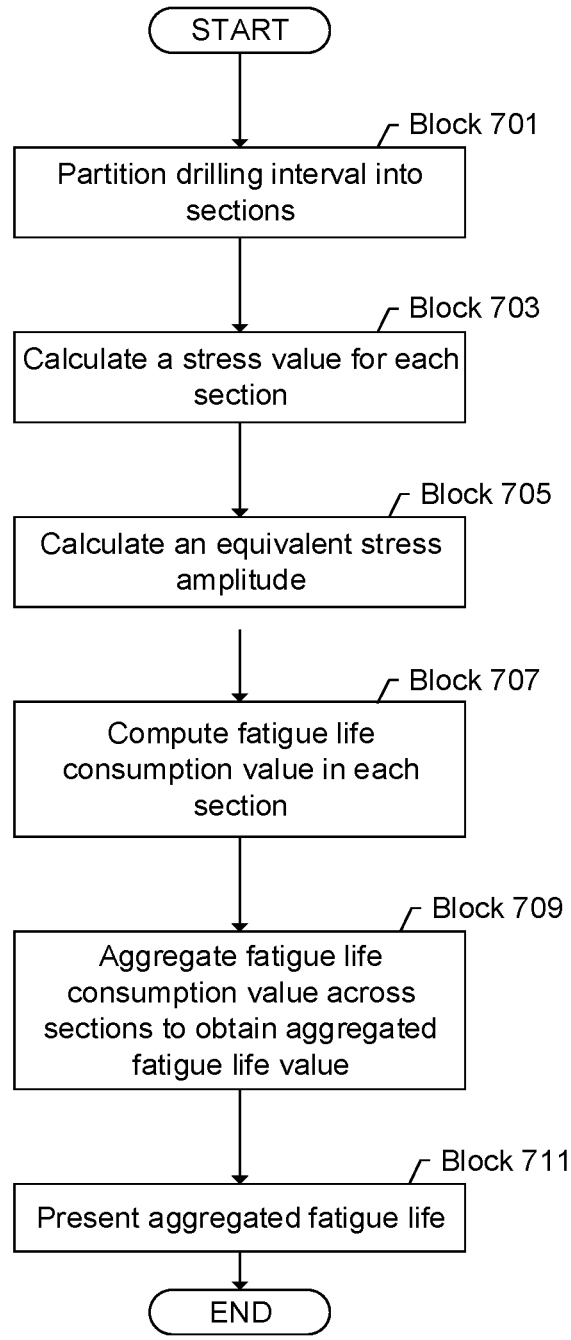
FIGS. 7 and 8 show flowcharts in accordance with one or more embodiments of the technology.

FIG. 7 shows an example flowchart in accordance with one or more embodiments of the technology. While the various blocks in this flowchart are presented and described sequentially, one of ordinary skill will appreciate that some of the blocks may be executed in different orders, may be combined or omitted, and some of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

Figure 8:
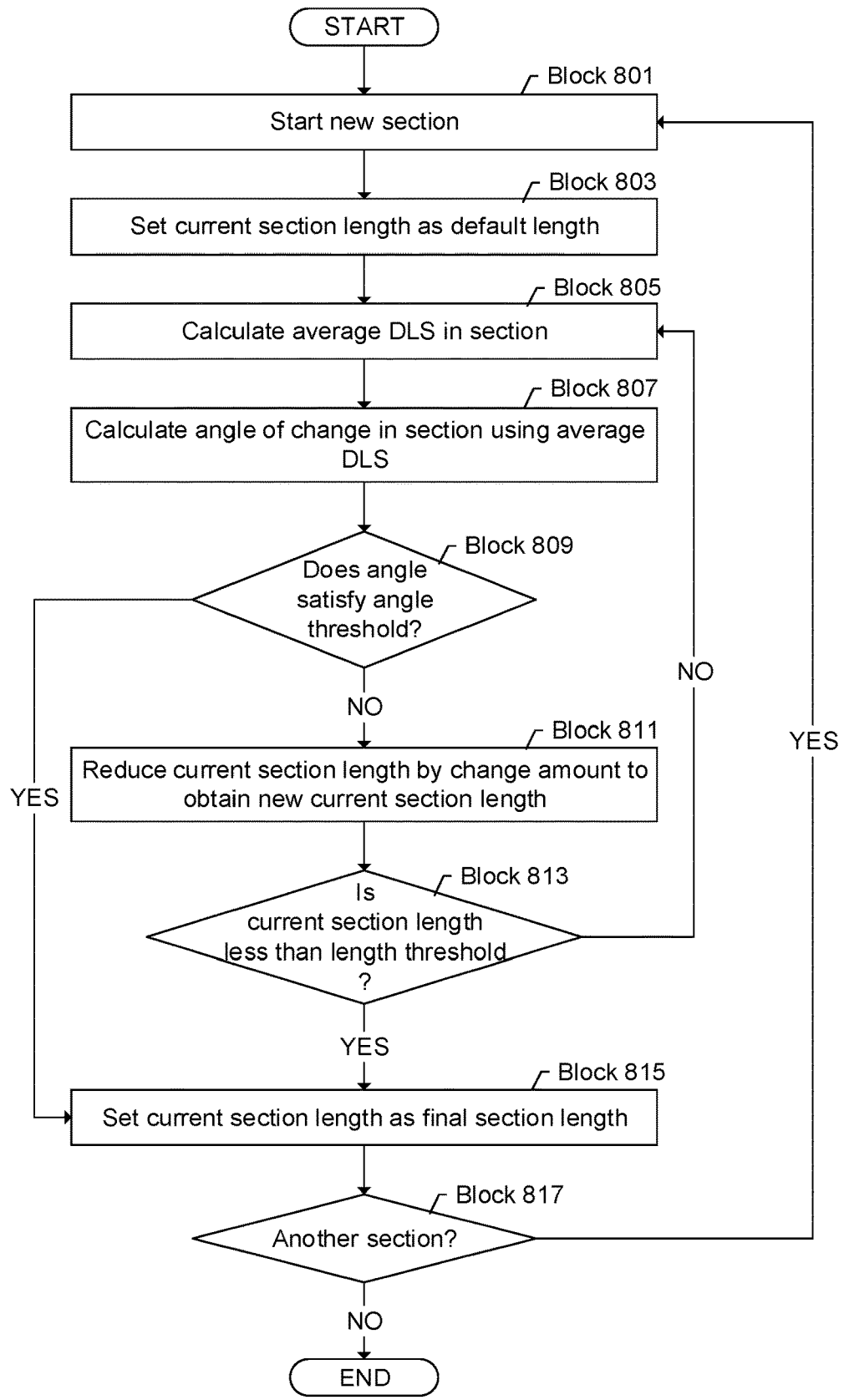

In Block 701 of FIG. 7, the drilling interval is partitioned into sections in accordance with one or more embodiments of the invention. In other words, the drilling interval is partitioned into sections in accordance with one or more embodiments of the invention. Different techniques may be used to partition the drilling interval into sections. For example, partitioning may be to divide the drilling interval into a fixed number of sections. By way of another example, the drilling interval may be partitioned into sections with a fixed section length By way of another technique, the drilling interval may be partitioned into sections with various section lengths. For example, the partitioning may be performed so that each section has limited well angle change. FIG. 8 shows a flowchart for performing segmentation in accordance with one or more embodiments of the invention. The various embodiments to perform the segmentation may be combined in virtually any manner.

Continuing with FIG. 7, in Block 703, a stress value for each section is calculated in accordance with one or more embodiments of the invention. For example, drilling simulation is performed on each section to obtain stress results. The drilling simulation may be performed independently for each section to obtain the stress on the entire drill string. The drilling simulation models the interaction between the drill string and the formation. For example, the simulations may calculate the amount of whirling motion, the dimensions of the borehole, and subsequently, the amount and type of stress on each piece of equipment of the drill string. The drilling simulation may be performed using a subsurface model of the underground formation. In one or more embodiments, the stress value from the simulations may include bending stress amplitude and mean stress is obtained from the stress results. In other words, for each section, the stress amplitude and mean stress is obtained.

In Block 705, the equivalent alternative stress amplitude is calculated in accordance with one or more embodiments of the invention. For example, the Goodman rule, discussed above, may be used to calculate the equivalent alternative stress amplitude. Examples for calculating the equivalent alternative stress amplitude is discussed below and in equations Eq. 3, Eq. 4 and Eq. 5. In one or more embodiments, the equivalent alternative stress amplitude is calculated independently for each section.

In Block 707, the failure life consumption in each section is computed in accordance with one or more embodiments of the technology. To calculate the fatigue life consumption value, the number of cycles to failure may be calculated. For example, the number of cycles to failure may be calculated based on the S-N curve using the equivalent alternative stress amplitude. The actual number of stress cycles spent in this section may be counted based on drilling parameters. Using the number of cycles to failure and the actual stress cycles used, the fatigue life consumption value may be determined based on the equipment for each part. For example, the equipment manufacturer may specify the maximal amount of fatigue. By way of another example, the amount of fatigue may be determined using experimental data. Examples for calculating the failure life consumption is discussed below and in equations Eq. 6 and Eq. 7.

In Block 709, the results across the sections are aggregated to obtain an aggregate fatigue life consumption value in accordance with one or more embodiments of the technology. For example, the aggregation may be summing the results, generated based on weightings, obtaining a minimal or maximal value, or performing another aggregation.

In Block 713, the aggregated fatigue life consumption value is presented in accordance with one or more embodiments of the invention. Presenting the aggregated fatigue life consumption value may include displaying the aggregated fatigue life consumption value on a physical display device, generating and displaying a report, transmitting an alert, sending the aggregated fatigue life consumption value to a user or system, such as the surface unit, performing another method of presentation, or combination thereof. Further, in one or more embodiments, a drilling operation may be performed based on the aggregated fatigue life consumption value. For example, the drilling operation may be to modify the mud weight, change a parameter of the rotation, pull the drill string out of the borehole (POOH) (e.g., based on the detection of imminent failure), halt drilling, continue drilling without modification of drilling parameters, performing another operation, or combination thereof. The drilling operation may be performed automatically or with human intervention. For example, the field management tool may send a command to the surface unit that automatically performs the drilling operation. By way of another example, the field management tool may generate a recommendation. For example, the recommendation may be generated by obtaining stored rules for the equipment, and performing the action in the stored rules.

FIG. 8 shows a flowchart for segmenting the drilling interval in accordance with one or more embodiments of the invention. In Block 801, a new section is started in accordance with one or more embodiments of the invention. Initially, the new section may be the top or the bottom of the drilling interval. In subsequent iterations, the new section is at the end of the previous section in accordance with one or more embodiments of the invention.

In Block 803, the current section length is set as the default length in accordance with one or more embodiments of the invention. The default length may be defined, for example, in configuration parameters, by a user, or as another default. The default length may be, for example, the maximum allowed length for a section.

In Block 805, an average dogleg severity (DLS) in the section is calculated in accordance with one or more embodiments of the invention. In one or more embodiments, the DLS is a normalized estimate of the overall curvature of an actual well path between two consecutive directional survey stations. The dogleg is a section of the hole that changes direction faster than anticipated or desired, and may have harmful side effects of greater stresses on the drill string. If the trajectory is along a planned well path, dogleg severity may at times be synonymous with build gradient and/or turn gradient.

In Block 807, an angle of change in the section is calculated using the average DLS in accordance with one or more embodiments of the invention. In other words, a determination is made as to how much change in angle that the hole exhibits.

In Block 809, a determination is made whether the angle satisfies the angle threshold. The change in angle may be determined to satisfy the angle threshold when the change in angle is less than or less than or equal to the angle threshold. For example, the angle threshold may be five degrees. Other angle thresholds may be used without departing from the scope of one or more embodiments. In other words, the angle threshold may be a maximum angle of change of the drilling section. If the angle satisfies the angle threshold, then the current section length is set as the final section length for the section in Block 815.

If the angle does not satisfy the angle threshold in Block 809, then the current section length is reduced by the change amount to obtain a new current section length in Block 811. In other words, the length of the current section is reduced to a new length.

In Block 813, a determination is made whether the current section length is less than the length threshold in accordance with one or more embodiments of the invention. In some embodiments, the determination may further be made whether the current section length is equal to the length threshold. The length threshold may be a minimum allowed length for a section. If the current section length is not less than, or equal to in some embodiments, the length threshold, the flow may return to Block 805 to calculate the average DLS for the section using the current section length.

Returning to Block 813, if the current section length is less than the length threshold, then the current section length is set as the final section length for the section in Block 815.

In Block 817, a determination is made whether another section exists in accordance with one or more embodiments of the invention. In other words, a determination is made whether the drilling interval is partitioned. If the drilling interval partitioning is not completed yet, the flow may return to Block 801. If the drilling interval is completely partitioned, the partitioned drilling interval may be used to perform the analysis above.

Figure 9:
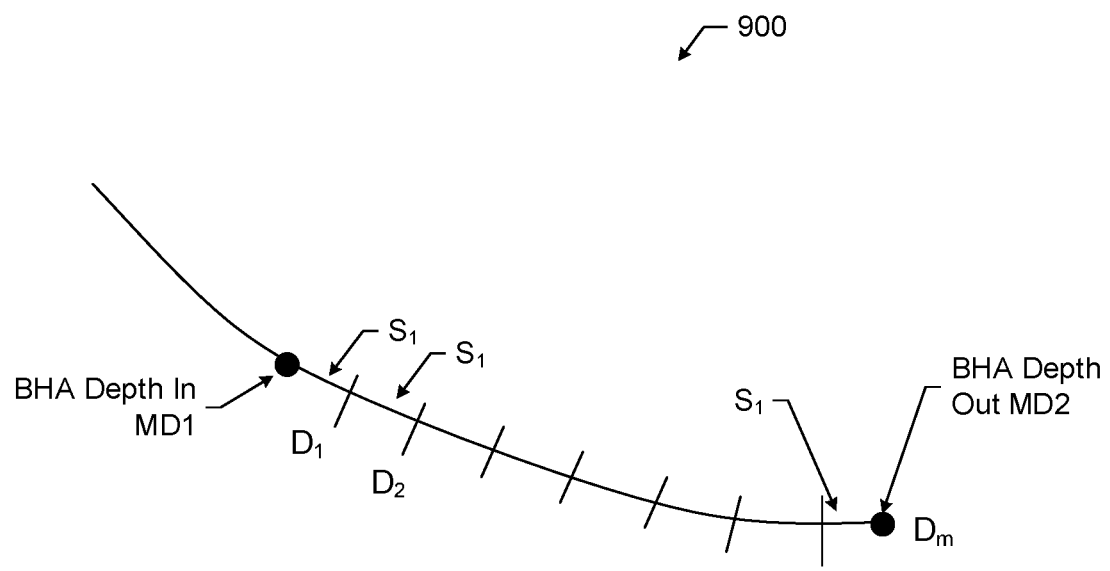
FIGS. 9 and 10 show examples in accordance with one or more embodiments of the technology.

FIG. 9 shows an example graph of partitioning the drilling interval in accordance with one or more embodiments of the technology. For the example shown in FIG. 9, assume BHA depth in/out are the MD1 and MD2. The drilling section [MD1, MD2] is divided into "m" sections. For example, the default section length L may be 90 feet or one pipe stand. The default section length may be different without departing from the scope of the technology. Further, in some embodiments, a user may modify the section length. For example, a recommend length may be between 40 feet and 200 feet. Each segment Si may have an end depth of $D_i$. Thus, $D_i = MD1 + i\,L$, where L is the length and i=1 ... m 1. Further, the length of last section, $S_m = MD2 - D_{m-1}$. If the length of the last section is less than a threshold (e.g., L/3), then the last section may be combined with the adjacent section.

The following is an example for performing a fatigue analysis procedure in accordance with one or more embodiments of the invention. Further, one or more embodiments may performed static analysis and/or dynamic analysis. Static analysis considers stress though the borehole that is based on the curvature of the borehole, and the rotation count of the drill string in a borehole. In other words, each rotation has a certain amount of alternative stress on the drill string that is caused by the curvature of the borehole combined with the rotation. By determining the number of cycles or rotations and the stress per cycle, the total fatigue life consumption may be determined in the static analysis case.

Dynamic analysis considers stress from both the curvature of the borehole and the rotating drill string, and other sources of alternative stress. For example, a drill string that is whipping through the borehole may have more stress than a simply rotating drill string. Thus, the whipping motion may cause more fatigue consumption over time. Thus dynamic analysis tracks stress on drill string using dynamic simulation. For example, sensor data may be used to calibrate a drilling model during drilling operation. Use simulations on the calibrated drilling model, the alternative stresses on the drill string are identified. Thus, fatigue consumption for the stress cycles of the drill string may be determined based on the various sources of alternative stress using drilling simulation. In one or more embodiments, a drilling simulation is conducted at the end depth of each section, $D_i$. The simulation inputs at the $i^{th}$ section Di may be $WOB_i$, $RPM_i$, and other inputs, such as motor flow rate, RSS steering command.

The static or dynamic fatigue life analysis in accordance with one or more aspects of the technology may be performed before and/or during drilling operations. For example, fatigue life management may be performed prior to drilling operations to generate a drilling plan that accommodates the fatigue life of the drill string. By way of another example, fatigue life management may be performed during drilling operations using sensor data to recalibrate a drilling model. The fatigue life management during drilling may be used to generate a warning when the amount of remaining fatigue life is less than a threshold or to provide an indicator as to when one or more parts on the drill string should be repaired or replaced.

Using the output of the simulation, the equivalent alternative stress amplitude may be calculated using the Goodman rule as follows. Assume the stand pipe pressure in the $i^{th}$ section is $SPP_i$. The mean stress component caused by the hydraulic pressure force may be calculated using equation (Eq. 3).

$$\sigma_{mean\_hydr} = \frac{SPP_i * ID^2}{OD^2 - ID^2} \quad \text{(Eq. 3)}$$

In Eq. 3, ID and OD are the size of drill string components at which the fatigue calculation is conducted. The mean stress caused by axial force ($\sigma_{mean\_axial}$) and hydraulic pressure force ($\sigma_{mean\_hydr}$) may be summed using the following equation (Eq. 4).

$$\sigma_{mean} = \sigma_{mean\_hydra} + \sigma_{mean\_axial} \quad \text{(Eq. 4)}$$

To account for the effect of mean stress, calculate the equivalent alternative stress amplitude $\sigma_{equ\_amp}$ using Goodman rule as shown in equation (Eq. 5).

$$\frac{\sigma_{alt\_amp}}{\sigma_{equ\_amp}} + \frac{\sigma_{mean}}{\sigma_{ultimate}} = 1 \quad \text{(Eq. 5)}$$

In Eq. 5, $\sigma_{ultimate}$ may be set using a default value, such as 100 ksi. Other default or non-default values may be used without departing from the scope of the claims.

Figure 10:
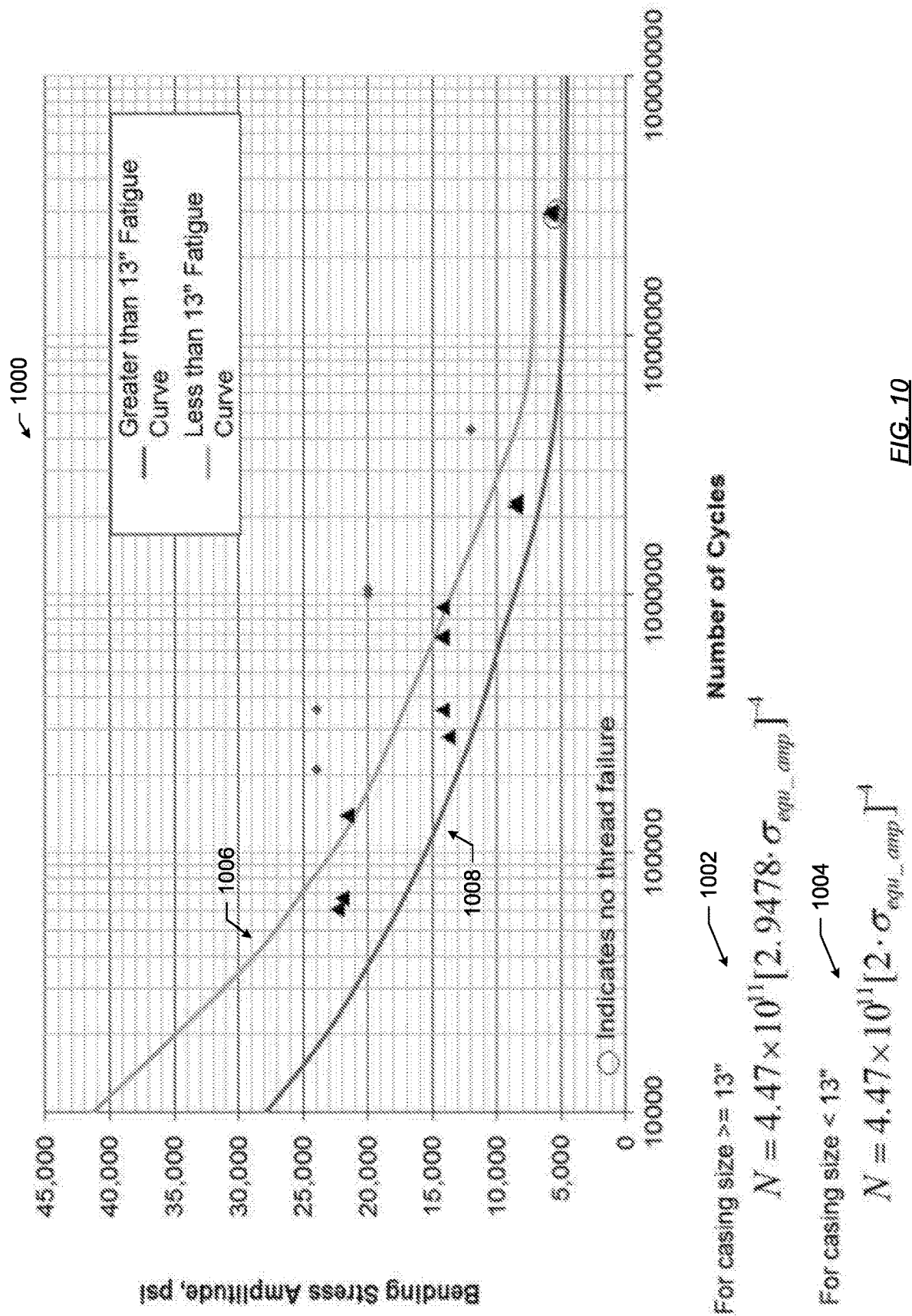

Based on the equivalent alternative stress amplitude, an S-N curve may be used to calculate a number of cycles to failure. FIG. 10 shows an example graph (1000) showing an example S-N curve for casings used for casing drilling. In FIG. 10, curve (1006) corresponds to function (1002), and curve (1008) corresponds to function (1004). As shown in FIG. 10, $\sigma_{equ\_amp}$, the cycle to fatigue can be determined using the fitted S-N curve equation. The cycle to fatigue is $N_i(h)$ at the location of h from bit based on the equivalent alternative stress amplitude calculated from the simulation in the $i^{th}$ section.

The number of cycles for each stress level may be determined using Rain Flow Counting method. In the example $n_i(h, s_k)$ is the number of cycles corresponding to equivalent alternative stress $s_k$. The endurance cycle to fatigue $N_i(h, s_k)$ may be determined from the S-N curve. The fatigue life consumed in the $i^{th}$ section at the location of distance h from bit may be calculated using the following equation (Eq. 6).

$$\text{Life\_consumed}(h)_i = \sum_k \frac{n_i(h, s_k)}{N_i(h, s_k)} \quad \text{(Eq. 6)}$$

Using Miner's rule, the cumulative fatigue damage may be calculated using equation (Eq. 7).

$$D(h) = \sum_{i=1}^{m} \text{Life\_consumed}(h)_i \quad \text{(Eq. 7)}$$

Thus, the total fatigue life consumption may be presented to a drilling operator to determine when to repair or replace equipment on the drill string. Because removing the drill string from the borehole or having equipment failure in the borehole may lead to costly delays, by having an accurate estimate of drilling fatigue may increase profitability of the field.

Figure 11:
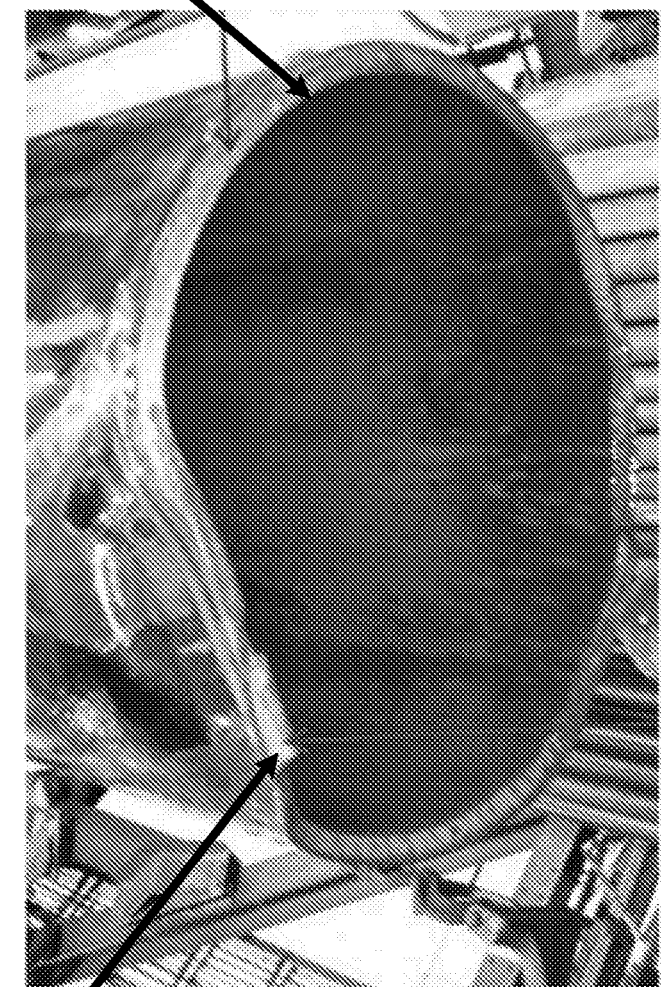

FIGS. 11-16 and below is an example in accordance with one or more embodiments of the invention. The following example is for explanatory purposes and not intended to limit the scope of the technology. The example of FIGS. 11-16 is a casing twist off failure. In particular, a 12.25"× 17.5" section of casing was twisted off at MD3702' (after about 17000 rotation revolution). Casing was parted right at the coupling. After POOH, it was found that the twist off location is 1270' from surface. FIG. 11 shows an image (1100) of the failure. As shown in FIG. 11, the portion (1102) is a smooth portion of the fracture surface showing a gradual fracture propagation. The portion (1104) is a jagged portion showing the final abruption.

FIGS. 12.1, 12.2, and 12.3 show the well profile. In particular, FIG. 12.1 shows graphs (1200) of the well profile from different angles. FIG. 12.2 shows an inclination graph (1210) of the well profile having a vertical axis of measured depth and a horizontal axis for inclination angle. The inclination angle at 3750 feet is 61 degrees as designated at point X (1212).

FIG. 12.3 shows a DLS graph (1220) of the well profile having a vertical axis of measured depth and a horizontal axis for DLS. Points (1222, 1224, 1226) on the graph are locations of high DLS as defined by a threshold.

One or more embodiments may partition the well into sections. For example, drilling interval (from 2779~3702 ft) may be divided into 25 sections. At the end depth of each section, a dynamic simulation is performed at the end depth of each section. The inputs of RPM, WOB, and SPP may be obtained from a "Drilling Report". In this example, the total collar revolution in each section is not calculated based on the average ROP from the simulation.

Figure 13:
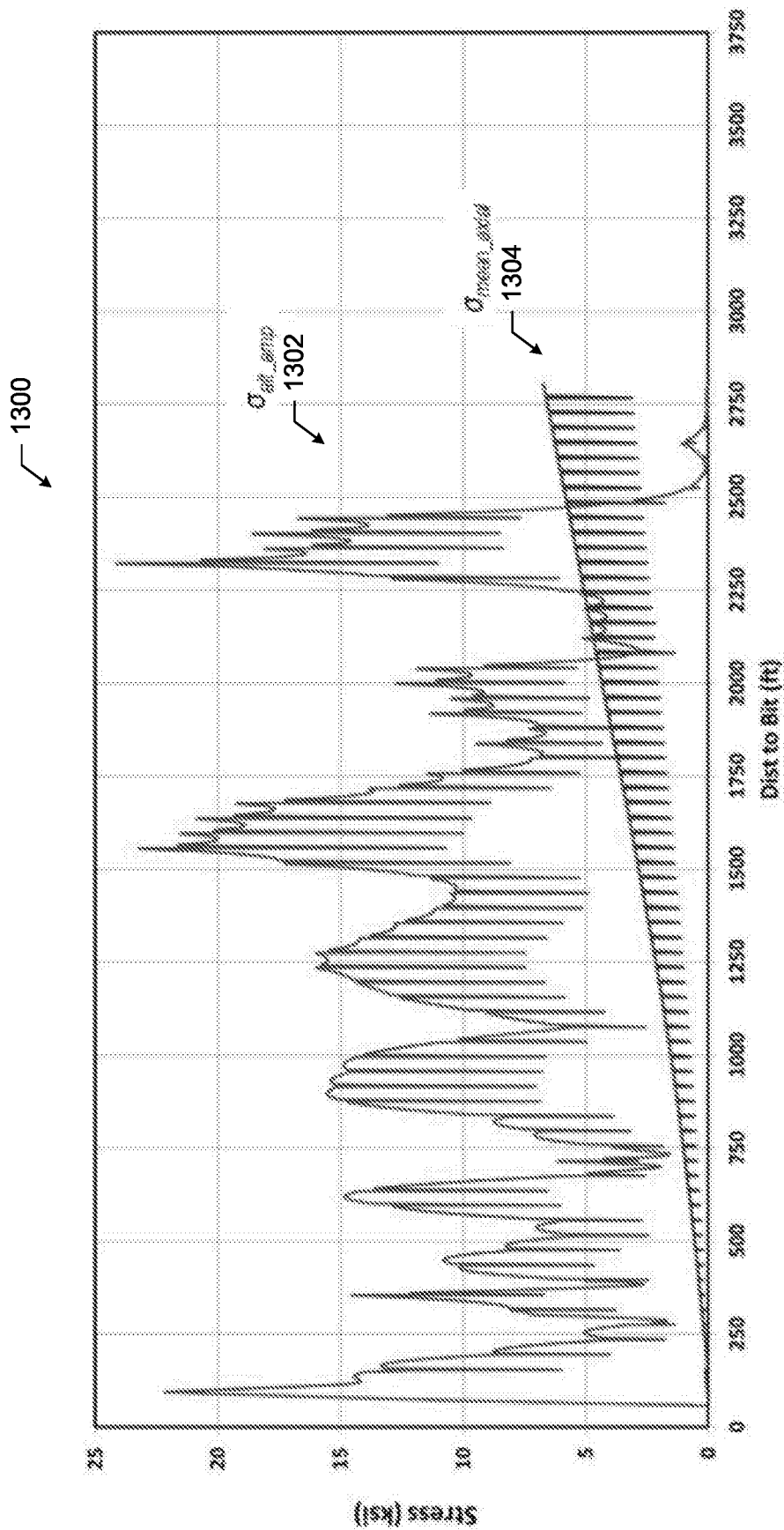

FIG. 13 shows a graph (1300) having stress on the vertical axis and distance to bit on the horizontal axis. Line (1302) is an stress amplitude. Line 1304 is a mean axial stress. The example of FIG. 13 is the stress profile on the casing string and does not include component caused by hydraulic pressure force.

Figure 14:
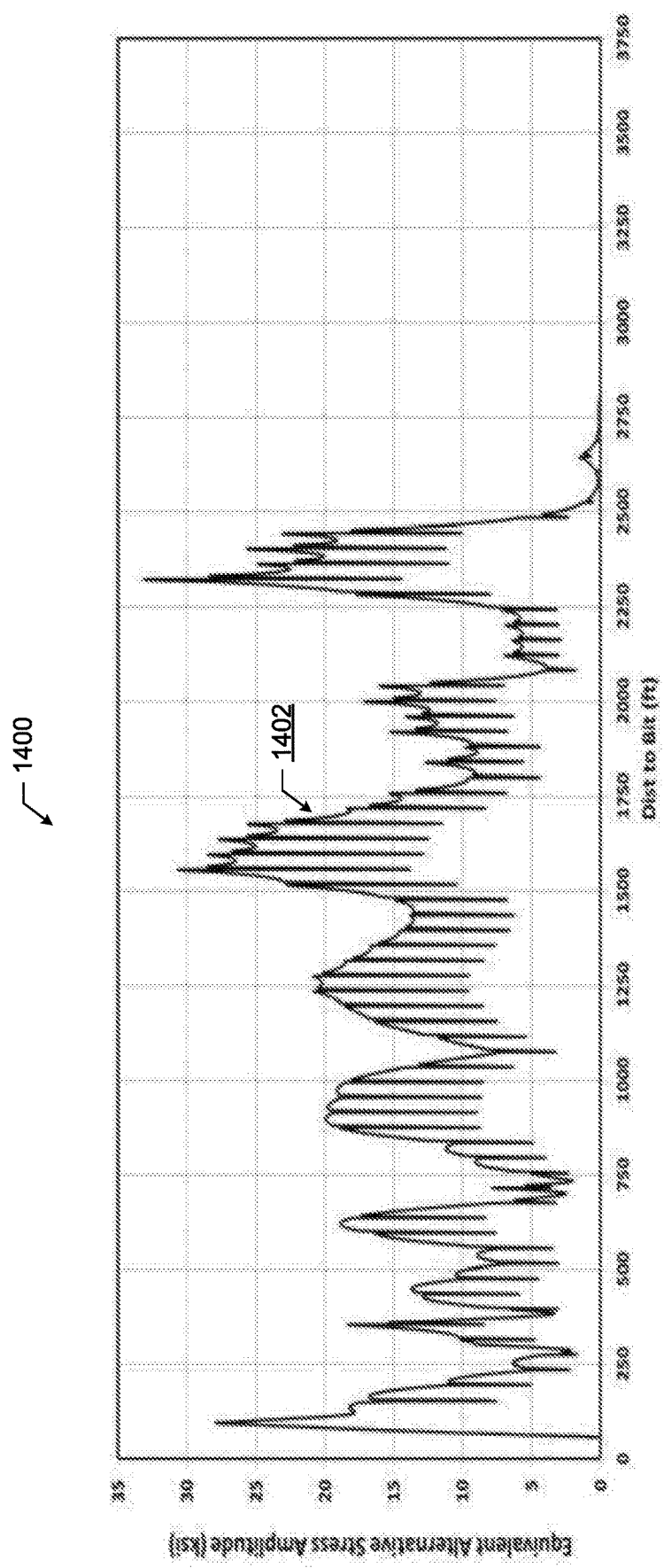

FIG. 14 shows a graph (1400) of the equivalent bending stress amplitude. In particular, the equivalent alternative stress amplitude is on the vertical axis and the distance to bit is on the horizontal axis. The Goodman equation may be used to calculate line (1402).

FIGS. 15.1, 15.2, 15.3, and 15.4 show graphs of fatigue life consumed in specific sections. In FIGS. 15.1, 15.2, 15.3, and 15.4, the vertical axis is fatigue life consumed and the horizontal axis is distance to bit. FIG. 15.1 shows a graph (1500) for section 1. FIG. 15.2 shows a graph (1510) for section 8. FIG. 15.3 shows a graph (1520) for section 16. FIG. 15.4 shows a graph (1530) for section 25.

Figure 16:
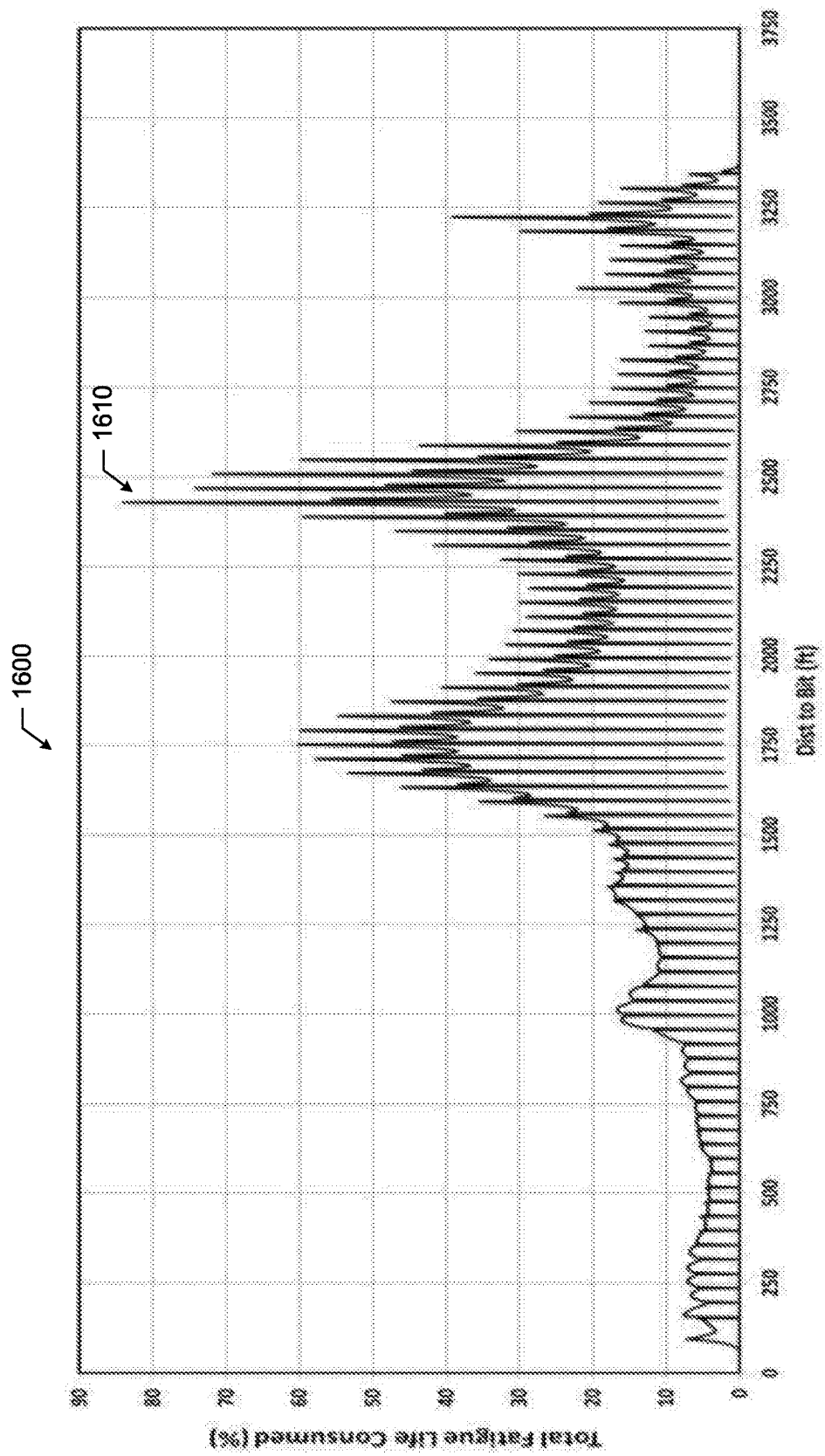

FIG. 16 shows a graph (1600) of the total fatigue damage. In other words, the vertical axis is the total fatigue damage and the horizontal axis is the distance to bit. The total fatigue damage may be obtained by summing the fatigue life consumption across the sections. As shown at point (1610), the location of the maximum total fatigue damage matches the field casing twist off depth of 1270' from the surface in FIG. 11.

FIGS. 17.1-17.3 show another example in accordance with one or more embodiments of the invention. The example in FIGS. 17.1-28 is for explanatory purposes and not intended to limit the scope of the technology. FIGS. 17.1, 17.2, and 17.3 show images of a RSS (rotary steering system) communication sub twist off failure. As WOB was raised up to 45 klbf to gain some ROP, surface torque reached about 37 klbf-ft causing the top drive stall. High shock and stick-slip were recorded. However, the drilling continued for another 3.5 hours without making progress. A loss of 750 psi SPP along with failed communication between RSS and MWD tool was observed. The drilling engineer decided to POOH, and the RSS communication sub was parted at 4 ft from the upper connection, which leaves lower portion of communication sub and RSS in the hole. Relatively smooth fracture surface indicates it is likely failed by fatigue. Image (1700) of FIG. 17.1 shows that the twist off occurred at the location of ID change. Image (1710) of FIG. 17.2 shows a cross sectional view. Image (1720) of FIG. 17.3 show secondary stress induced cracks.

Figure 18:
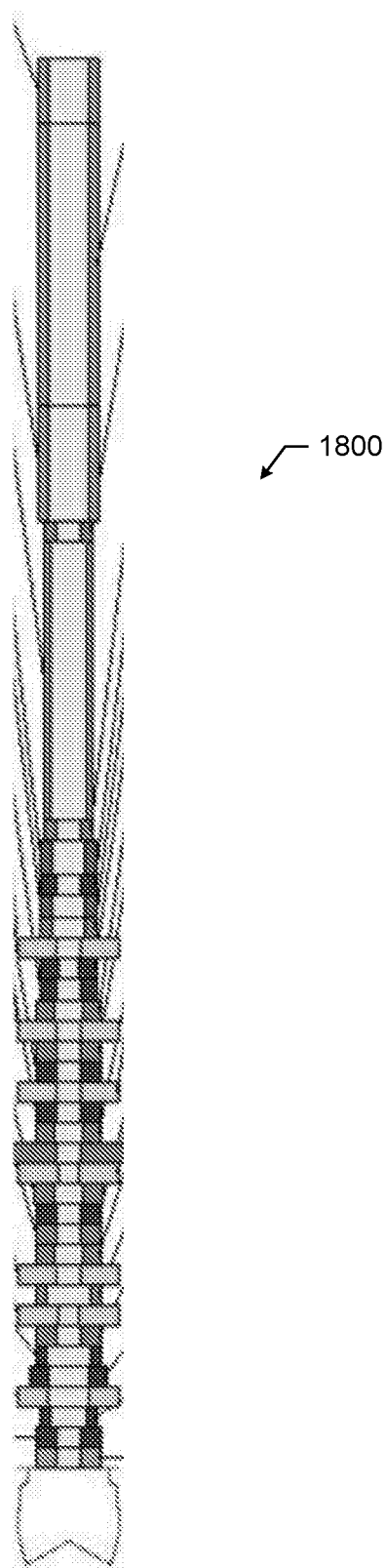

FIG. 18 shows a diagram of the drill string (1800) in the example. As shown in FIG. 18, the drill string may have many components. Each component may have a corresponding set of modeling values and information that describes the movement of the drill string through the well. The well in the example is near vertical with less than 1.5 deg/100 ft DLS, under which the tool was designed to have infinite fatigue life. Severe downhole vibration could cause fatigue failure even in a straight well.

Figure 20:
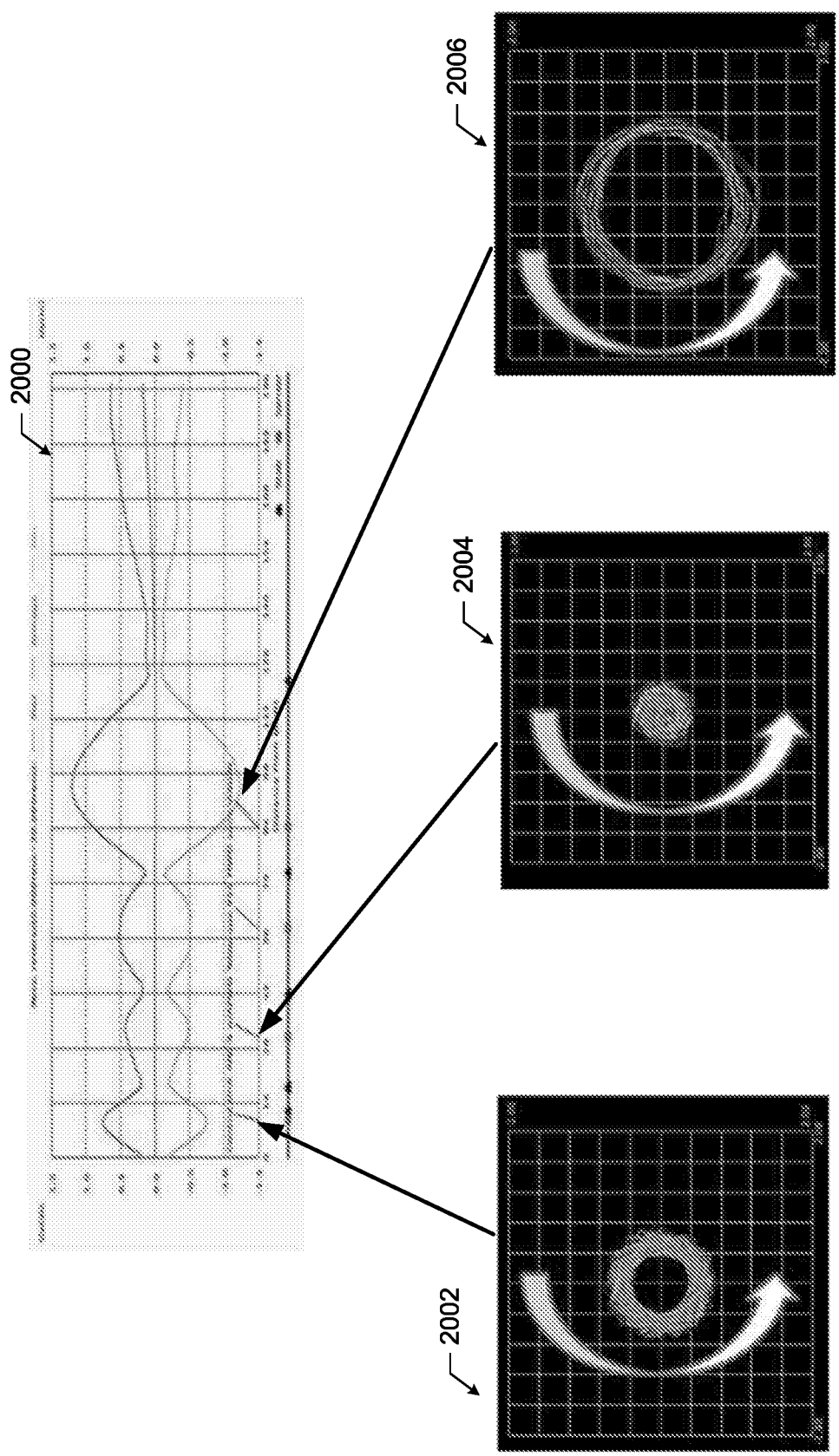

FIG. 19 shows a chart (1900) of simulation parameters that may be used to perform the simulations. Using the simulation parameters, the fatigue life consumption may be determined for the example. FIG. 20 shows a graph (2000) of the simulation through the well. Simulation shows that the BHA is under severe backward whirling. The backward whirling leads both high bending stress magnitude and high stress cycle, and therefore high fatigue potential. Graph (2002) shows the amount of whirling 9 feet from the bit. Graph (2004) shows the amount of whirling 30 feet from the bit. Graph (2006) shows the amount of whirling 98 feet from the bit.

Figure 21:
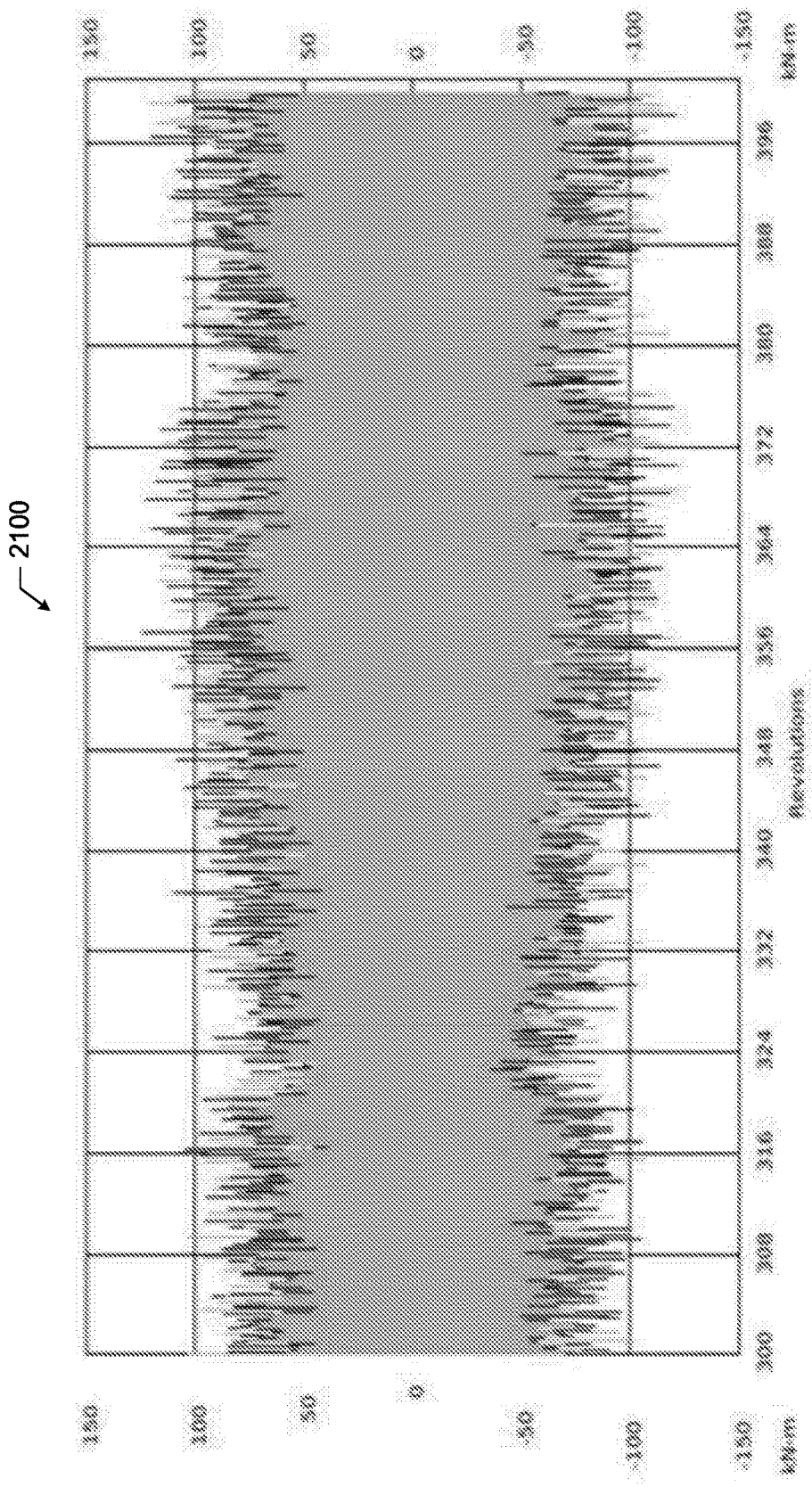
Figure 22:
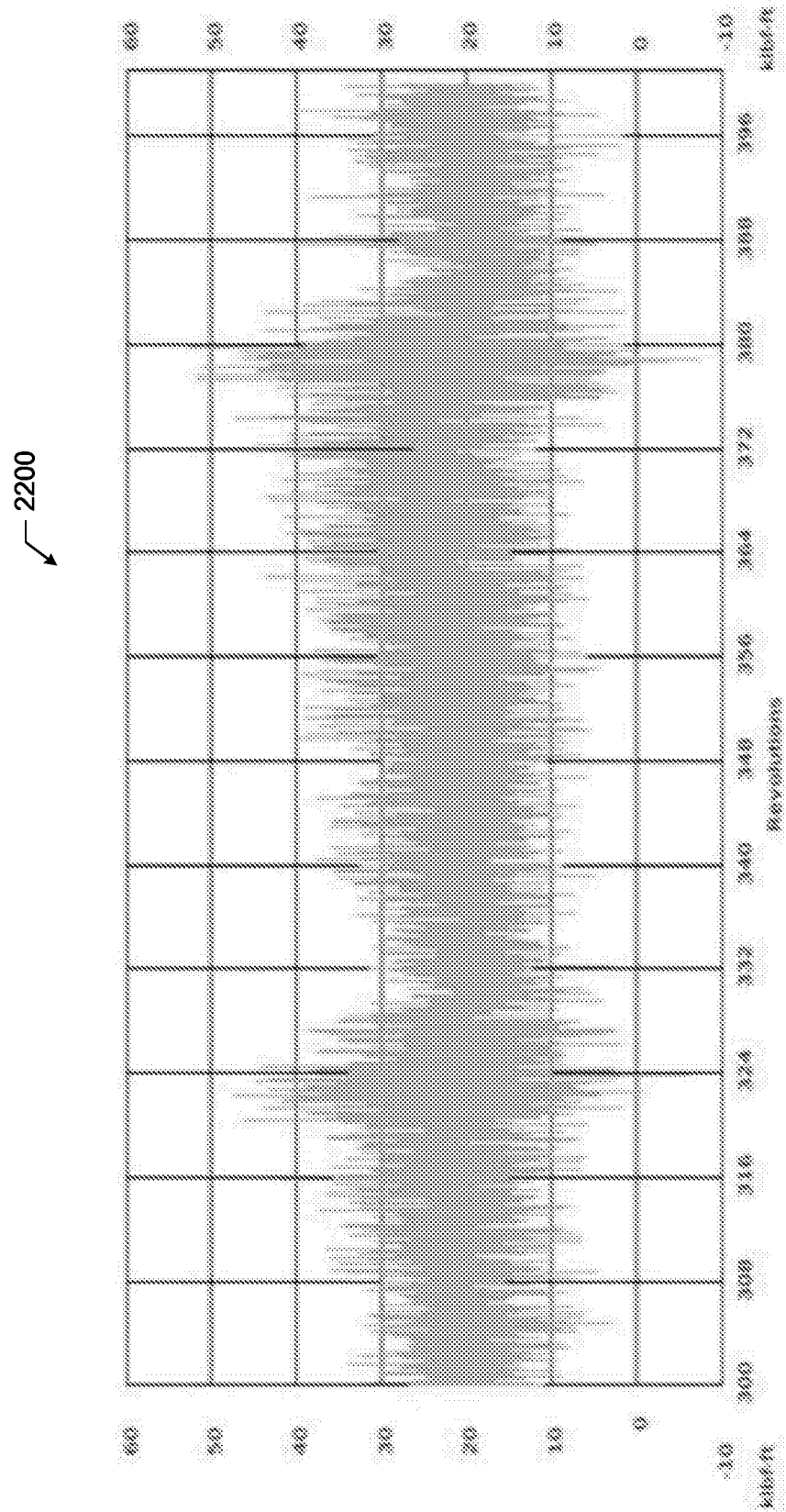
Figure 23:
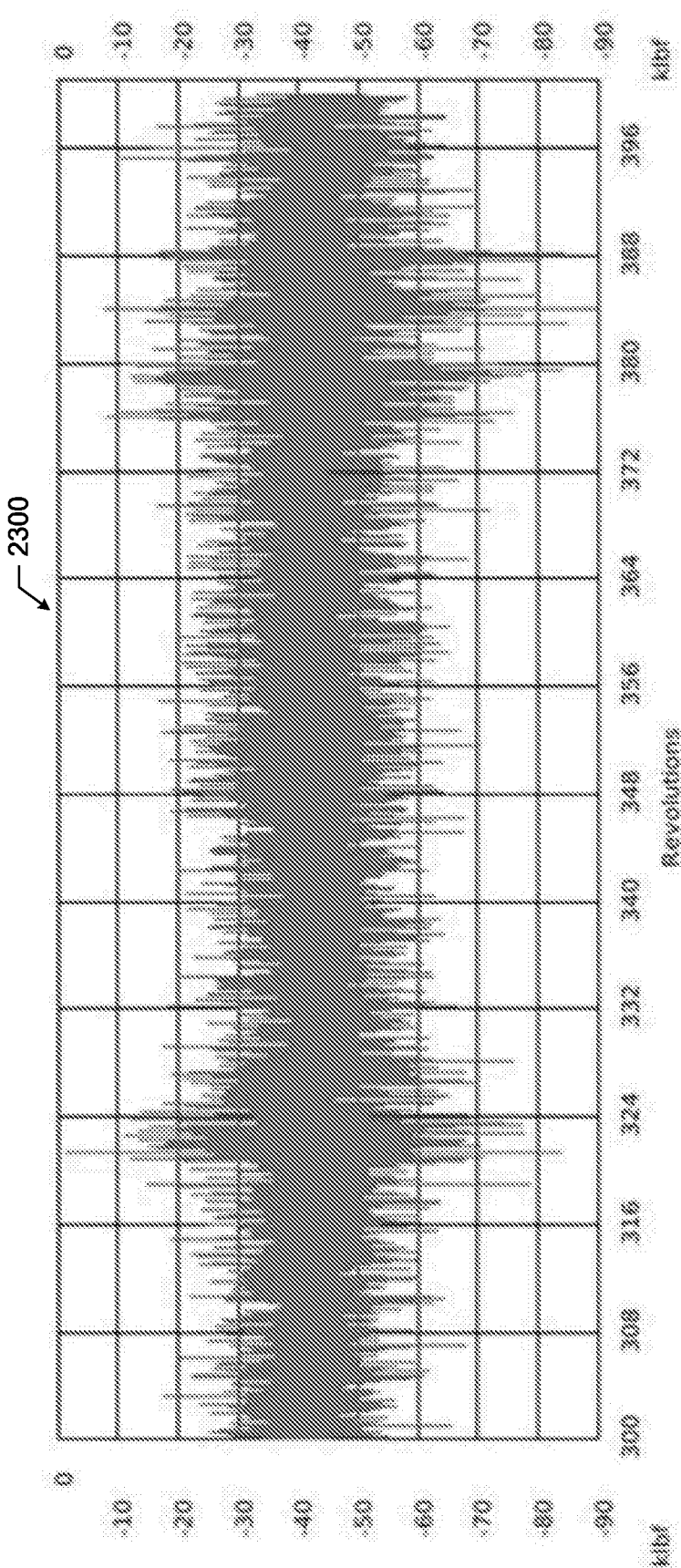

FIG. 21 shows a graph (2100) of the bending moment components at a particular measured depth in accordance with one or more embodiments of the invention. The horizontal axis is revolutions and the vertical axis is an amount of bending moment. FIG. 22 shows a graph (2200) of the torque at a particular measured depth in accordance with one or more embodiments of the invention. The horizontal axis is revolutions and the vertical axis is an amount of torque. FIG. 23 shows a graph (2300) of the axial force at a particular measured depth in accordance with one or more embodiments of the invention. The horizontal axis is revolutions and the vertical axis is an amount of axial force. Negative axial force is compression in accordance with one or more embodiments of the invention.

Figure 24:
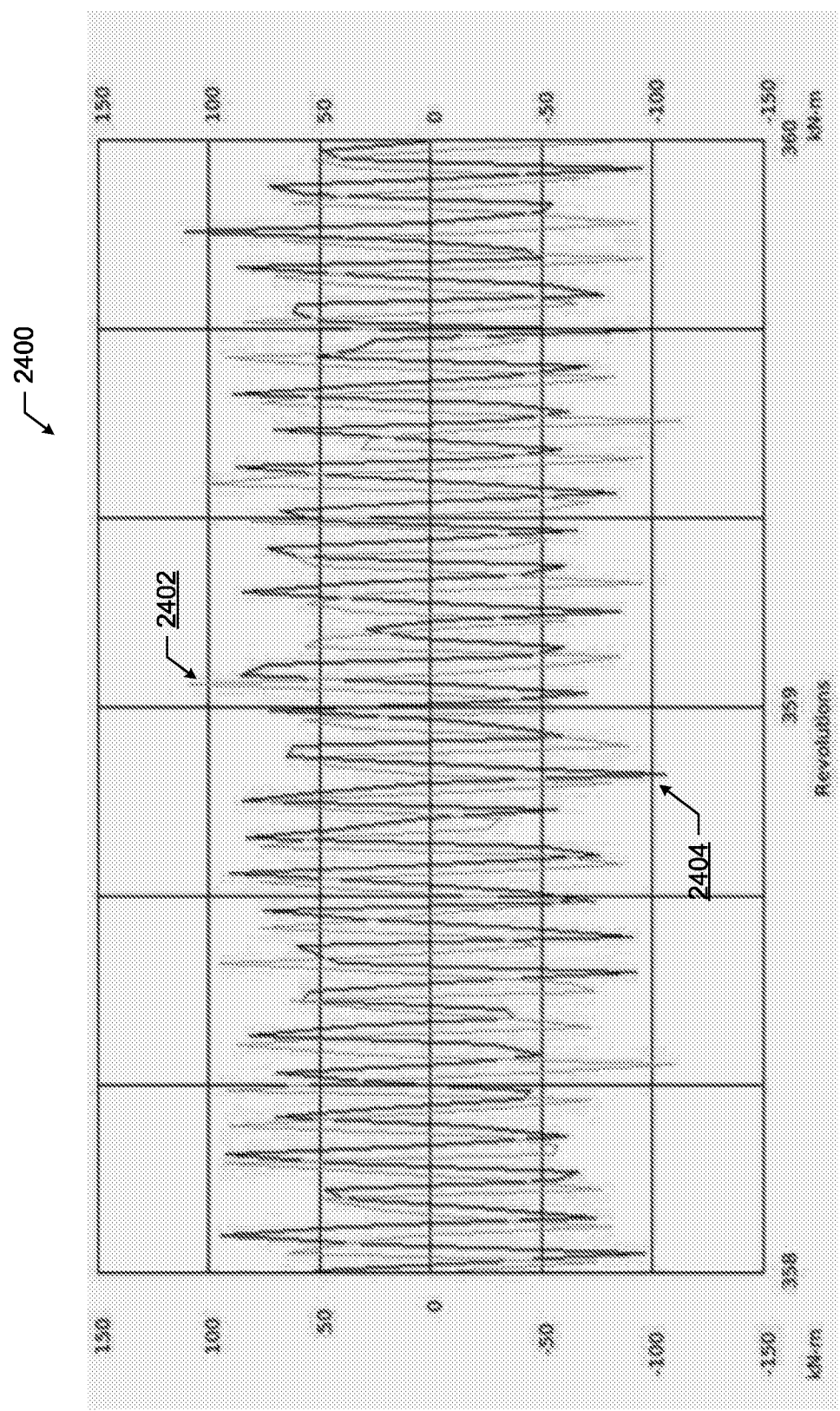

FIG. 24 shows a graph (2400) of a bending moment time history. The vertical axis is bending moment and the horizontal axis is revolutions. Line (2402) is the bending moment Y and line (2404) is the bending moment Z. As shown in the graph, the bending moment fluctuates at a much higher rate than RPM. In particular, about 14-15 variation cycles of bending moment is within one collar revolution. Therefore, the fatigue life is accumulated much quicker as backward whirling happens.

Figure 25:
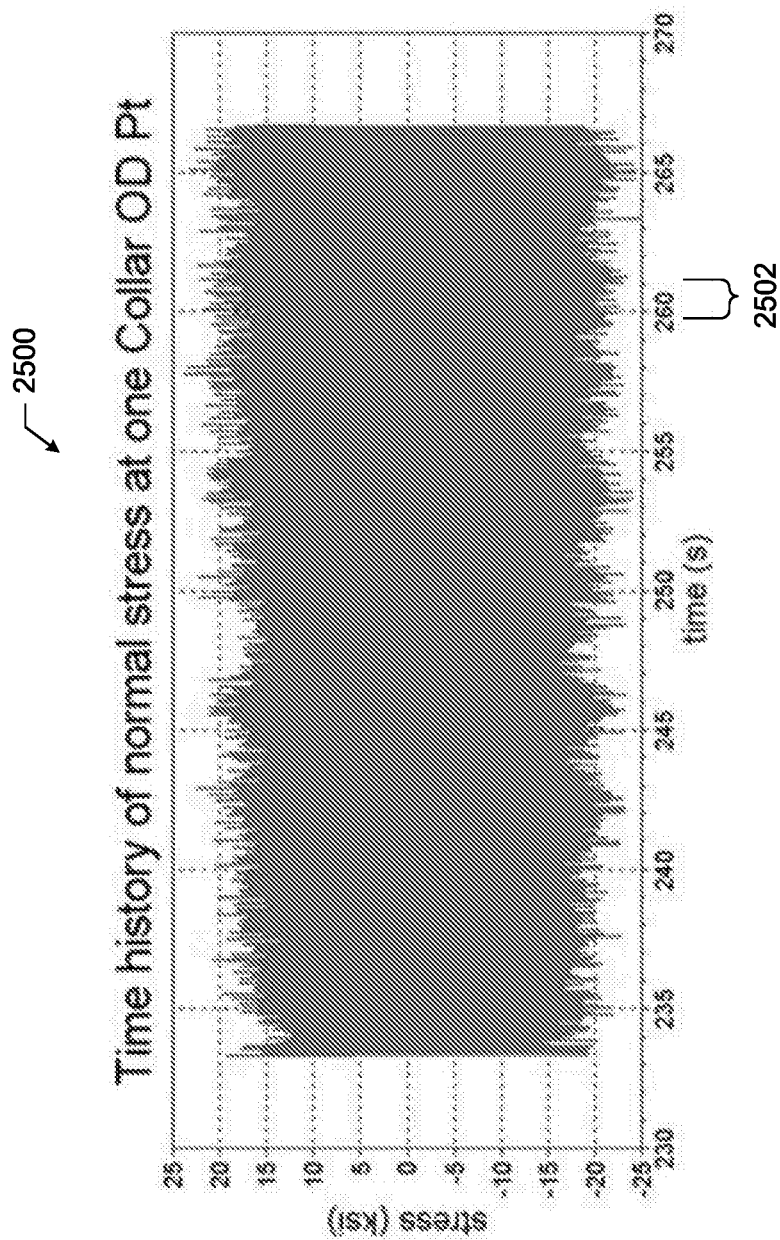
Figure 26:
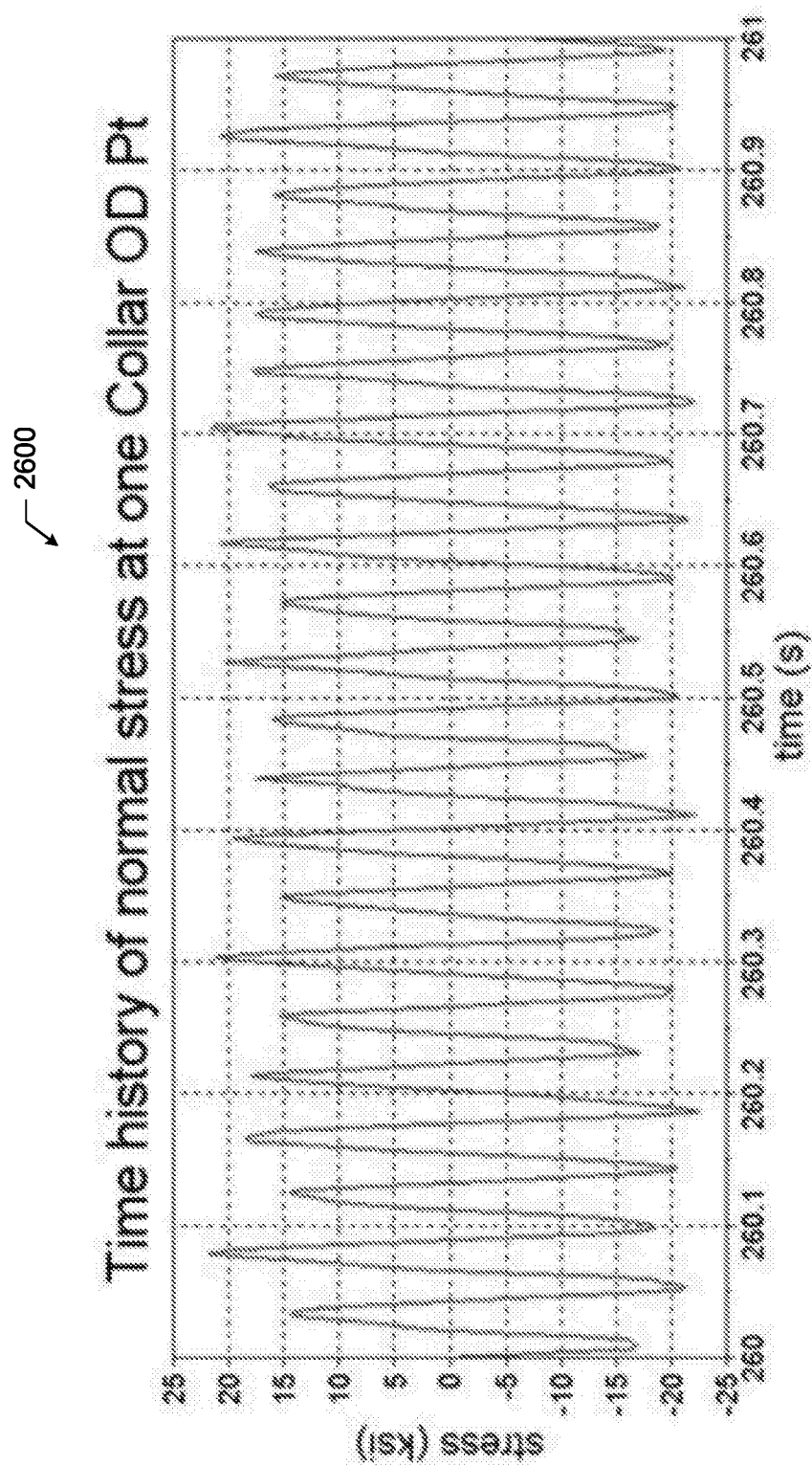

FIG. 25 shows a time history graph (2500) of stress at a collar in the example in accordance with one or more embodiments of the invention. The vertical axis is stress and the horizontal axis is time. Portion 2502 of the graph (2500) in FIG. 25 is shown in FIG. 26. In other words, FIG. 26 shows another time history graph (2600) of stress at a collar in the example in accordance with one or more embodiments of the invention. The vertical axis is stress and the horizontal axis is time. The graph in FIG. 26 is for the increment (2502) in FIG. 25. As shown in FIG. 26, the whirling motion creates high stress amplitudes.

Figure 27:
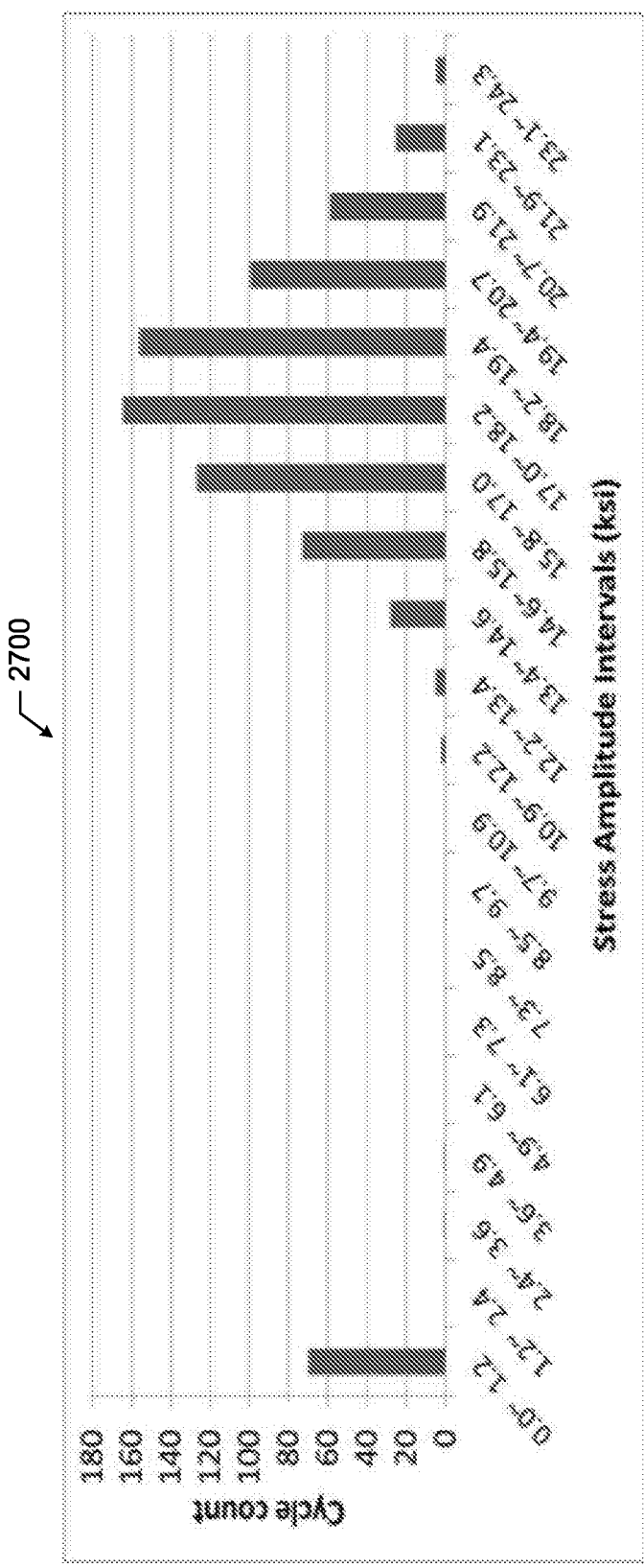

In lieu of Rain flow counting method, the stress cycles under various stress magnitudes were counted. FIG. 27 shows a histogram (2700) of the stress amplitude and the cycles. In FIG. 27, the horizontal axis is the stress amplitude interval, and the vertical axis is the count of cycles whose stress amplitude falls into the corresponding interval.

FIG. 28 shows a chart (2800) of the cumulative fatigue damage. In the 20 stress sections, the average amplitude and average mean stresses are calculated. The average stress amplitude and average mean stresses are used to represent the stress level in that stress section. The equivalent alternative stress amplitude is calculated using Goodman's rule for each stress section. The endurance cycle to fatigue N(sk) may be determined from S-N curve/equation for the kth section. The number of cycles for each stress section may be calculated by multiplying the cycles by ratio of drilling time and simulation time, and used to calculate the fatigue life consumption for each stress section. The fatigue life consumption may be summed across the sections to obtain the total fatigue life damage. The chart (2800) shows the fatigue life consumption rate is about 34.5% per hour when severe backward whirling happens. The field operation before twist off is about 3.5 hours. The predicted cumulative fatigue risk is very high and matches the actual failure of shown in FIGS. 17.1, 17.2, and 17.3. Thus, one or more embodiments may be used to predict the failure before the failure occurs.

The computing system(s) performing one or more embodiments described herein may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type"). Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others.

The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the invention.

The field management tool may further include a data repository. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited by the attached claims.

What is claimed is:

1. A method for managing fatigue life of a drill string comprising:
    partitioning a drilling interval into a plurality of sections, wherein the drilling interval is a section of a well drilled using the drill string;
    calculating stress values on the drill string, wherein respective stress values are calculated separately for respective, individual sections of the plurality of sections, by simulating the interaction between the drill string and a formation in the drilling interval using a simulator;
    using the stress value, calculating an equivalent alternative stress amplitude on the drill string, wherein respective equivalent alternative stress amplitudes are calculated separately for respective, individual sections of the plurality of sections from the stress value;
    computing fatigue life consumption values, wherein respective fatigue life consumption values correspond to respective, individual sections of the plurality of sections;
    aggregating the fatigue life consumption values associated with each of the plurality of sections together to obtain an aggregated fatigue life consumption value for the drill string over the drilling interval;
    presenting the aggregated fatigue life consumption value for the drill string; and
    at least one of:
        displaying a warning to adjust a drilling operation in response to the aggregated fatigue life consumption exceeding a predetermined threshold;
        displaying an indicator as to when one or more parts on the drill string should be repaired or replaced based at least in part on the aggregated fatigue life consumption; or
        causing a drilling operation to be adjusted in response to the aggregated fatigue life consumption.

2. The method of claim 1, wherein the stress value is calculated using static analysis.

3. The method of claim 2, wherein the static analysis uses, for at least one section of the plurality of sections, a number of rotations per minute and an amount of time for the at least one section.

4. The method of claim 1, wherein the stress value is calculated using dynamic analysis.

5. The method of claim 4, wherein the dynamic analysis comprises:
    calculating stress of the drill string in the drilling interval using a drilling model to generate the stress value.

6. The method of claim 5, wherein the dynamic analysis further comprises:
    obtaining sensor data while drilling;
    calibrating the drilling model using the sensor data to obtain a calibrated drilling model,
    wherein stress of the drill string in the drilling interval is calculated using the calibrated drilling model.

7. The method of claim 1, further comprising:
    generating a stress and number of cycles to failure (S-N) curve for a drilling component of the drill string; and
    calculating, for the drilling component when drilling at least two sections of the plurality of sections, a number of stress cycles at different magnitudes,
    wherein the fatigue life consumption is calculated using the stress cycles and S-N curve.

8. The method of claim 1, further comprising:
    performing the drilling operation based on the aggregated fatigue life consumption value that is presented, wherein the drilling operation is selected from the group consisting of:
    modifying a mud weight;
    changing a parameter of rotation;
    pulling the drill string out of a borehole;
    halting drilling; and
    continuing drilling without modification of drilling parameters.

9. The method of claim 1, further comprising managing a fatigue life of the drill string based at least in part on the presented aggregated fatigue life consumption value.

10. The method of claim 1, wherein partitioning the drilling interval into the plurality of sections comprises:
    determining an average dogleg severity;
    determining an angle of change in each of the plurality of sections based on the average dogleg severity;
    determining that the angle of change in one of the plurality of sections exceeds a threshold; and
    reducing a length of the one of the plurality of sections in response to determining that the angle of change in the one of the plurality of sections exceeds the threshold.

11. The method of claim 1, wherein partitioning the drilling interval into a plurality of sections is based at least in part on a dogleg severity of the well.

12. The method of claim 1, wherein the plurality of sections each extend by a finite length along the drilling interval.

13. A system for managing fatigue life of a drill string comprising:
    a computer processor; and
    memory comprising instructions for:
        partitioning a drilling interval into a plurality of sections, wherein the drilling interval is a section of a well drilled using the drill string;
        calculating stress values on the drill string, wherein respective stress values are calculated separately for respective, individual sections, by simulating the interaction between the drill string and a formation in the drilling interval using a simulator;
        using the stress value, calculating an equivalent alternative stress amplitude on the drill string, wherein respective equivalent alternative stress amplitudes are calculated separately for respective, individual sections of the plurality of sections from the stress value;
        computing fatigue life consumption values, wherein respective fatigue life consumption values correspond to respective, individual sections of the plurality of sections;
        aggregating the fatigue life consumption values associated with each of the plurality of sections together to obtain an aggregated fatigue life consumption value for the drill string over the drilling interval;
        presenting the aggregated fatigue life consumption value for the drill string; and
        at least one of:

displaying a warning to adjust a drilling operation in response to the aggregated fatigue life consumption exceeding a predetermined threshold;

displaying an indicator as to when one or more parts on the drill string should be repaired or replaced based at least in part on the aggregated fatigue life consumption; or causing a drilling operation to be adjusted in response to the aggregated fatigue life consumption.

14. The system of claim 13, wherein the stress value is calculated using dynamic analysis.

15. The system of claim 14, wherein the dynamic analysis comprises: calculating stress of the drill string in the drilling interval using a drilling model to generate the stress value.

16. The system of claim 15, wherein the dynamic analysis further comprises:
obtaining sensor data while drilling;
calibrating the drilling model using the sensor data to obtain a calibrated drilling model,
wherein stress of the drill string in the drilling interval is performed using the calibrated drilling model.

17. The system of claim 13, wherein the memory further comprises instructions for:
generating a stress and number of cycles to failure (S-N) curve for a drilling component of the drill string; and
calculating, for the drilling component when drilling at least two sections of the plurality of sections, a number of stress cycles at different magnitudes,
wherein the fatigue life consumption is calculated using the stress cycles and S-N curve.

18. A non-transitory computer readable medium for managing fatigue life of a drill string comprising computer readable program code for:
partitioning a drilling interval into a plurality of sections, wherein the drilling interval is a section of a well drilled using the drill string;
calculating stress values on the drill string, wherein respective stress values are calculated separately for respective, individual sections by simulating the interaction between the drill string and a formation in the drilling interval using a simulator;
using the stress value, calculating an equivalent alternative stress amplitude on the drill string, wherein respective equivalent alternative stress amplitudes are calculated separately for respective, individual sections of the plurality of sections from the stress value;

computing fatigue life consumption values, wherein respective fatigue life consumption values correspond to respective, individual sections of the plurality of sections;

aggregating the fatigue life consumption values associated with each of the plurality of sections together to obtain an aggregated fatigue life consumption value for the drill string over the drilling interval;

presenting the aggregated fatigue life consumption value for the drill string; and at least one of:
displaying a warning to adjust a drilling operation in response to the aggregated fatigue life consumption exceeding a predetermined threshold;
displaying an indicator as to when one or more parts on the drill string should be repaired or replaced based at least in part on the aggregated fatigue life consumption; or
causing a drilling operation to be adjusted in response to the aggregated fatigue life consumption.

19. The non-transitory computer readable medium of claim 18, wherein the stress value is calculated using dynamic analysis.

20. The non-transitory computer readable medium of claim 19, wherein the dynamic analysis comprises:
calculating stress of the drill string in the drilling interval using a drilling model to generate the stress value.

21. The non-transitory computer readable medium of claim 20, wherein the dynamic analysis further comprises:
obtaining sensor data while drilling;
calibrating the drilling model using the sensor data to obtain a calibrated drilling model, wherein stress of the drill string in the drilling interval is calculated using the calibrated drilling model.

22. The non-transitory computer readable medium of claim 18, further comprising computer readable program code for:
generating a stress and number of cycles to failure (S-N) curve for a drilling component of the drill string; and
calculating, for the drilling component when drilling at least two sections of the plurality of sections, a number of stress cycles at different magnitudes,
wherein the fatigue life consumption is calculated using the stress cycles and S-N curve.

\* \* \* \* \*